Feb. 12, 1946. R. S. DRUMMOND 2,394,757
GEAR FINISHING MACHINE
Filed March 23, 1942 19 Sheets-Sheet 1

INVENTOR.
ROBERT S. DRUMMOND
BY
ATTORNEYS

Feb. 12, 1946.    R. S. DRUMMOND    2,394,757
GEAR FINISHING MACHINE
Filed March 23, 1942    19 Sheets-Sheet 2

INVENTOR.
ROBERT S. DRUMMOND
BY
ATTORNEYS

Feb. 12, 1946. R. S. DRUMMOND 2,394,757
GEAR FINISHING MACHINE
Filed March 23, 1942 19 Sheets-Sheet 3

INVENTOR.
ROBERT S. DRUMMOND
BY
ATTORNEYS

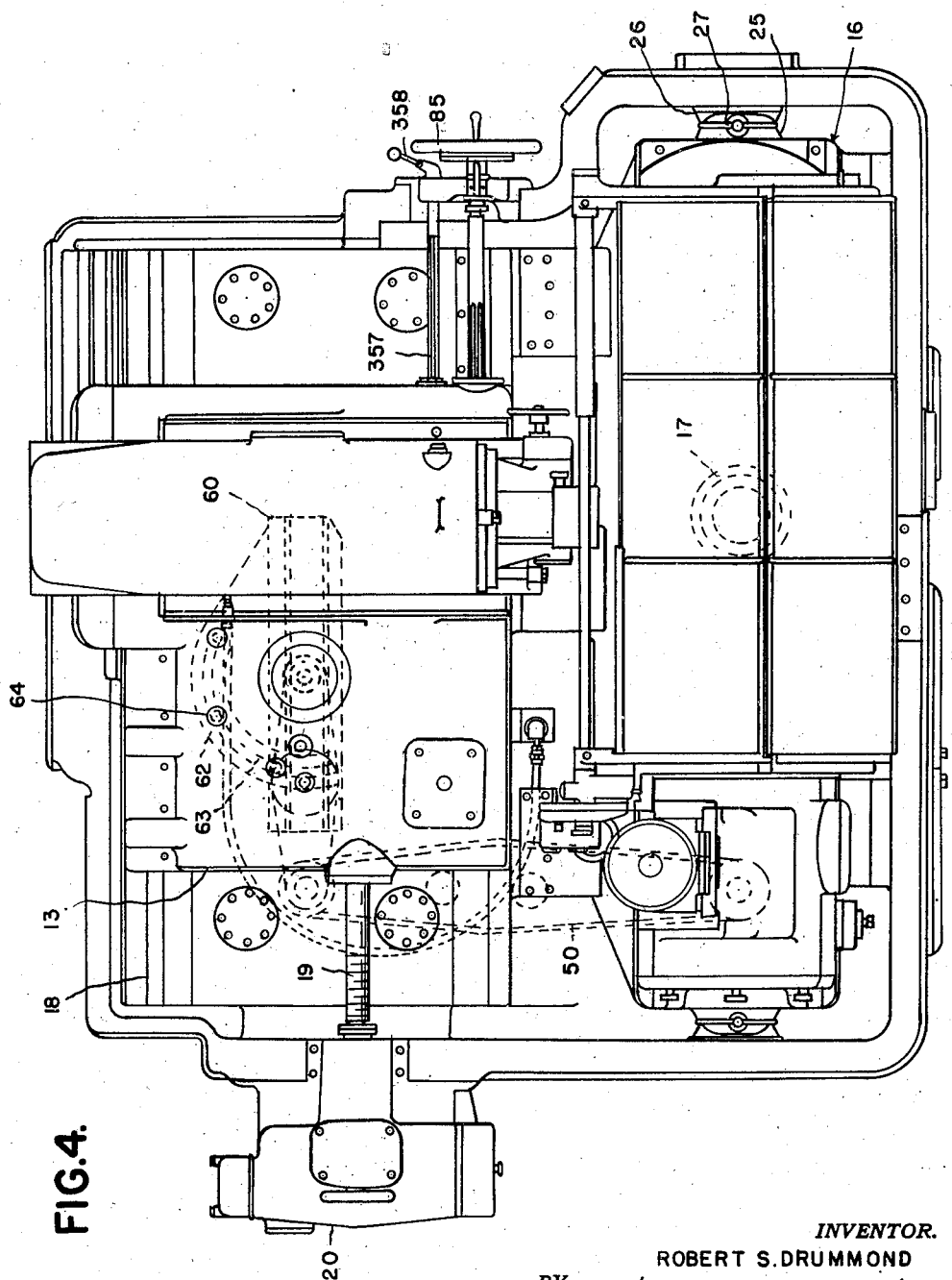

Feb. 12, 1946.　　　R. S. DRUMMOND　　　2,394,757
GEAR FINISHING MACHINE.
Filed March 23, 1942　　　19 Sheets-Sheet 5
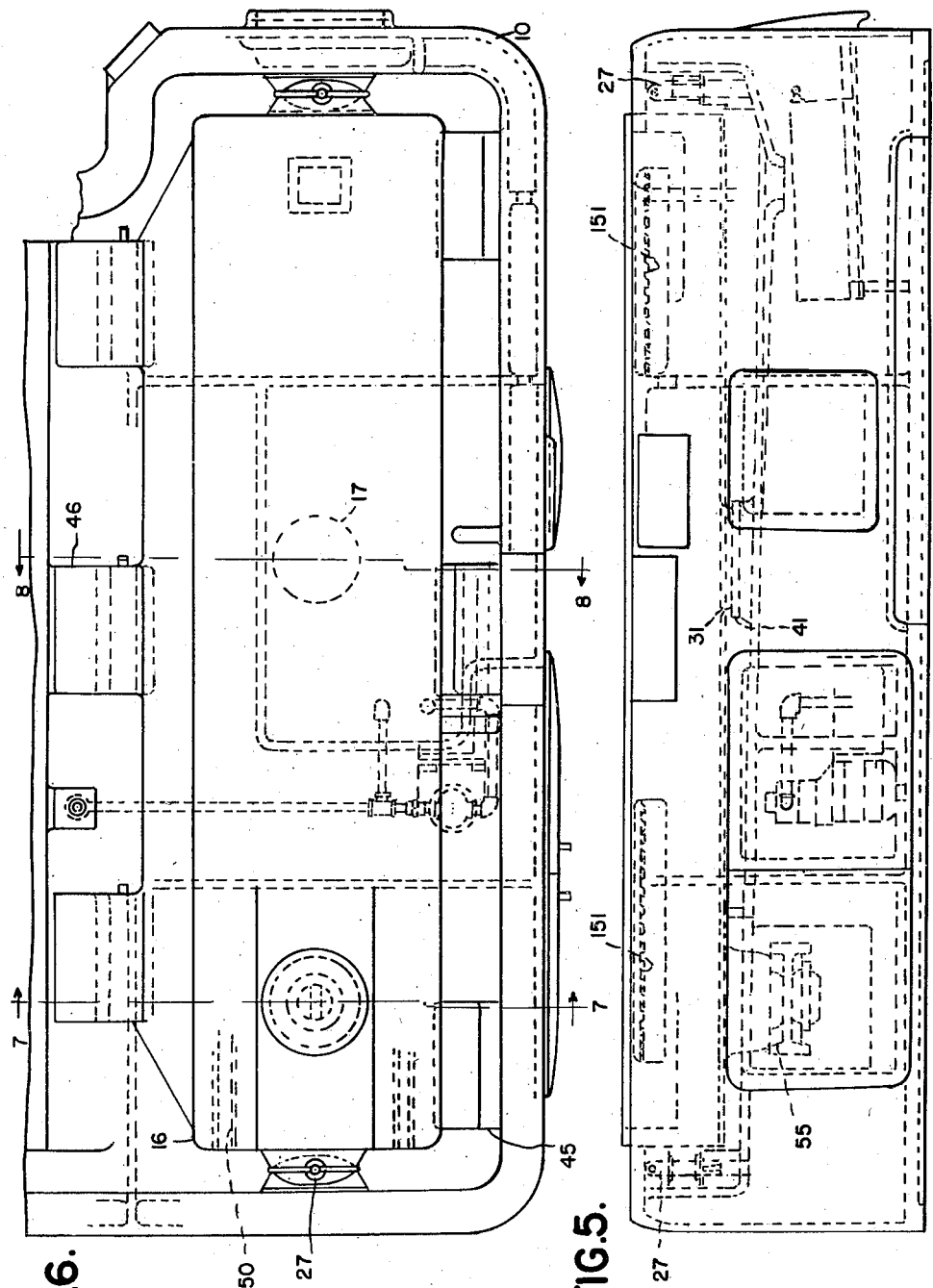
INVENTOR
ROBERT S. DRUMMOND
BY
ATTORNEYS Feb. 12, 1946.   R. S. DRUMMOND   2,394,757
GEAR FINISHING MACHINE
Filed March 23, 1942   19 Sheets-Sheet 6

INVENTOR.
ROBERT S. DRUMMOND
BY
ATTORNEYS

Feb. 12, 1946.  R. S. DRUMMOND  2,394,757
GEAR FINISHING MACHINE
Filed March 23, 1942  19 Sheets-Sheet 7
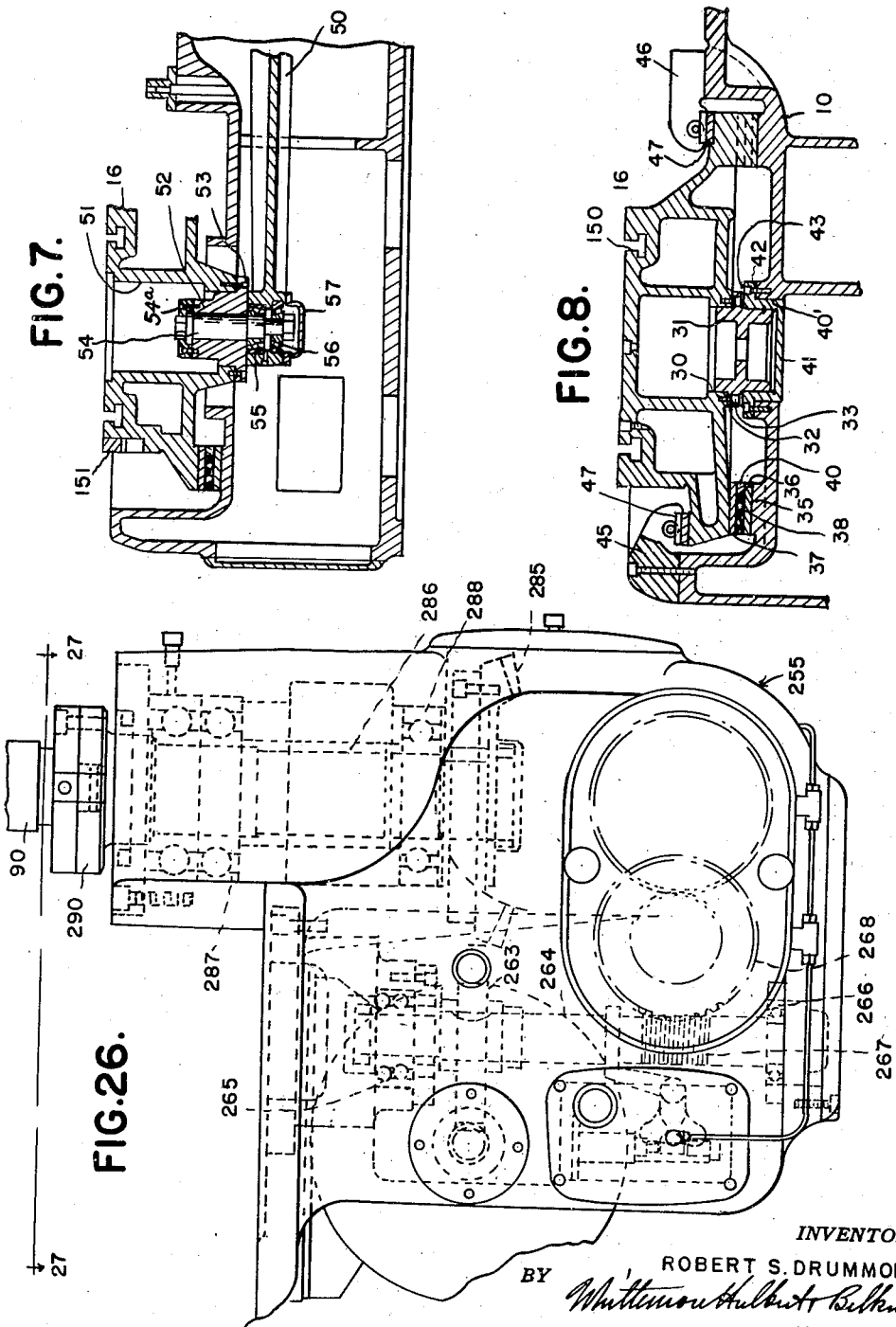
INVENTOR.
ROBERT S. DRUMMOND
BY
ATTORNEYS

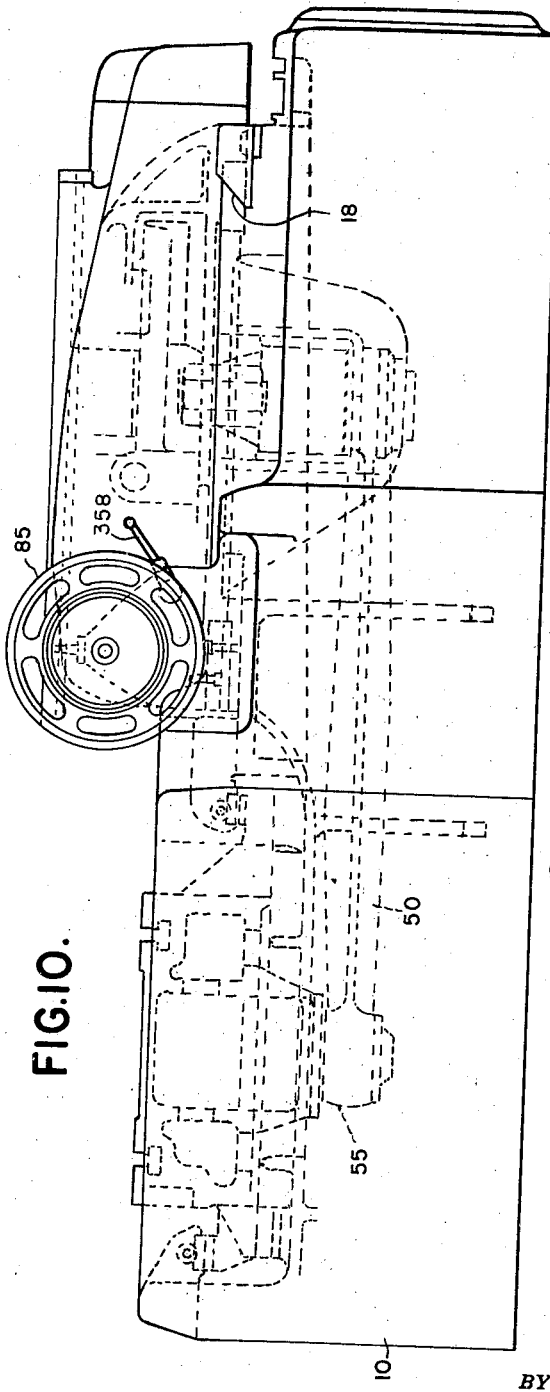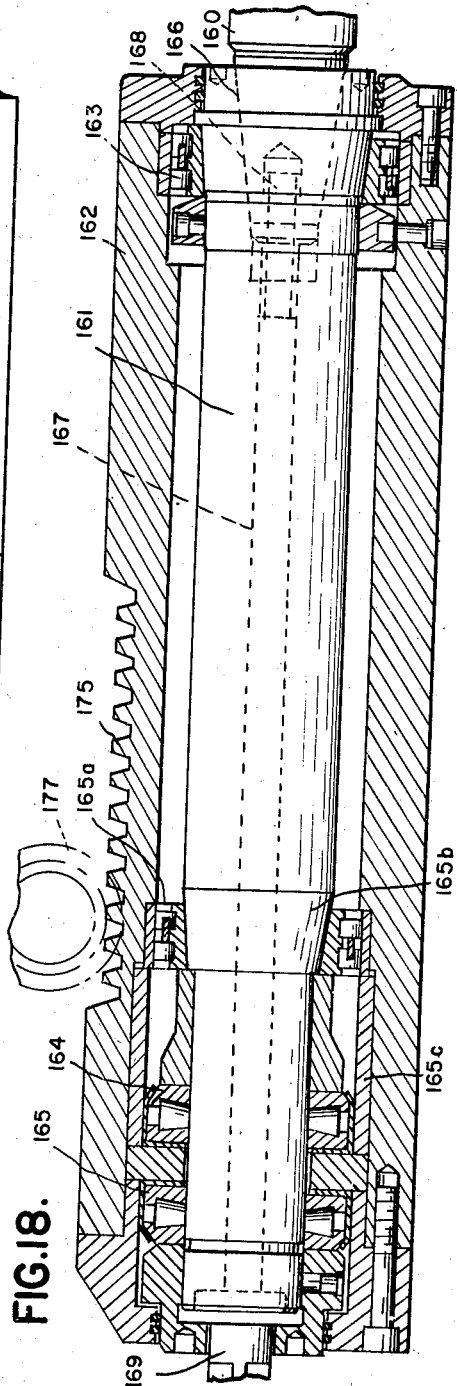

Feb. 12, 1946.　　　R. S. DRUMMOND　　　2,394,757
GEAR FINISHING MACHINE
Filed March 23, 1942　　19 Sheets-Sheet 9

INVENTOR.
ROBERT S. DRUMMOND
BY
ATTORNEYS

Feb. 12, 1946.   R. S. DRUMMOND   2,394,757
GEAR FINISHING MACHINE
Filed March 23, 1942   19 Sheets-Sheet 10

INVENTOR.
ROBERT S. DRUMMOND
BY
ATTORNEYS

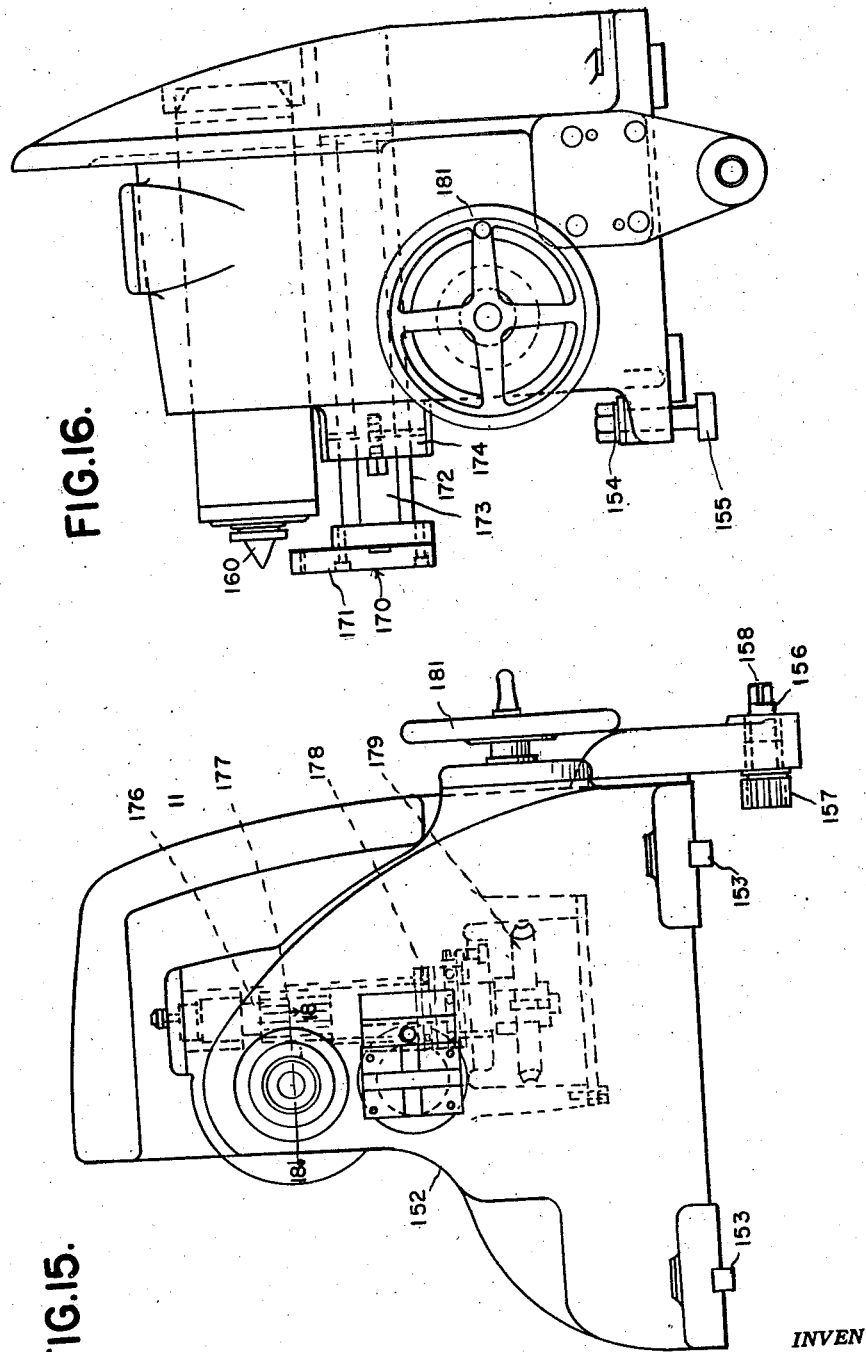

Feb. 12, 1946.　　　R. S. DRUMMOND　　　2,394,757
GEAR FINISHING MACHINE
Filed March 23, 1942　　　19 Sheets-Sheet 12

INVENTOR.
ROBERT S. DRUMMOND
BY
ATTORNEYS

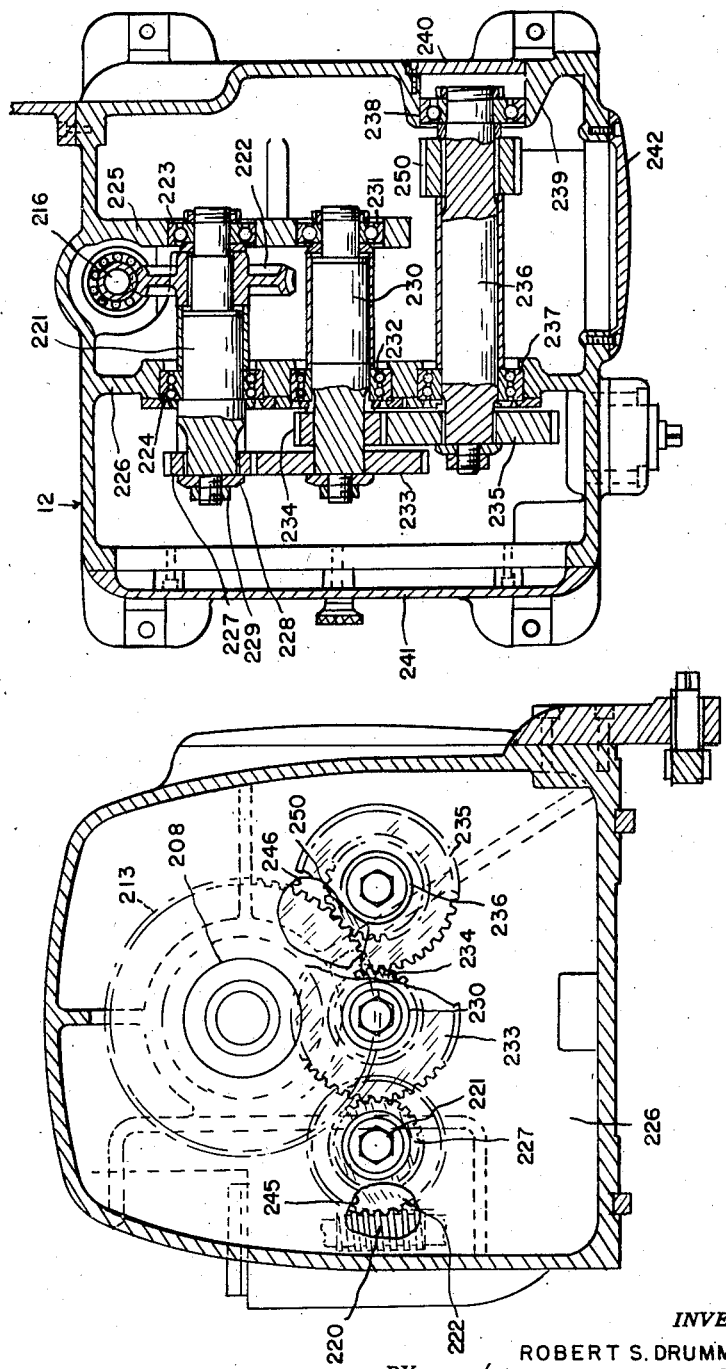

Feb. 12, 1946.  R. S. DRUMMOND  2,394,757
GEAR FINISHING MACHINE
Filed March 23, 1942  19 Sheets-Sheet 15

INVENTOR.
ROBERT S. DRUMMOND
BY
ATTORNEYS

Feb. 12, 1946.  R. S. DRUMMOND  2,394,757
GEAR FINISHING MACHINE
Filed March 23, 1942  19 Sheets-Sheet 16
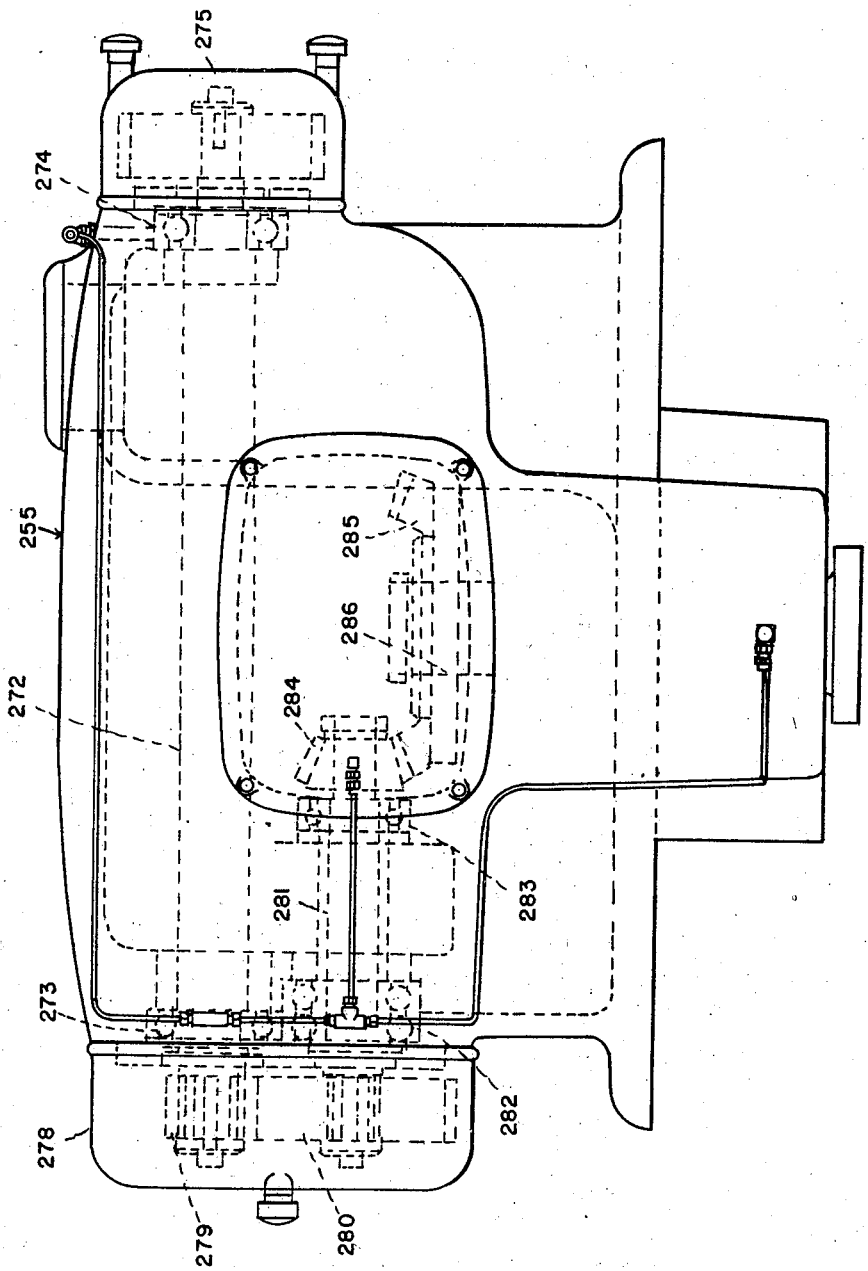
INVENTOR.
ROBERT S. DRUMMOND
BY
ATTORNEYS Feb. 12, 1946.　　　R. S. DRUMMOND　　　2,394,757
GEAR FINISHING MACHINE
Filed March 23, 1942　　　19 Sheets-Sheet 17
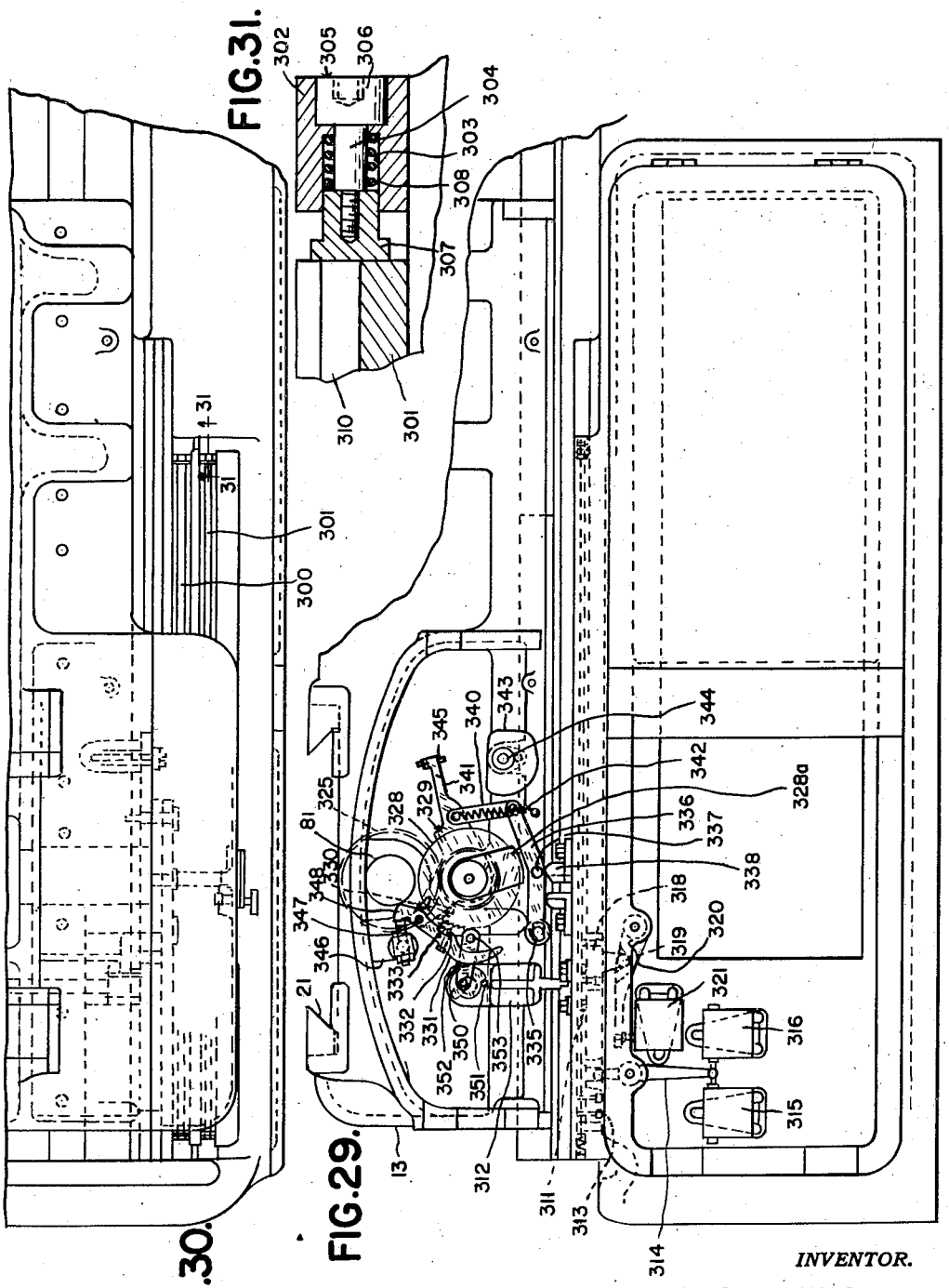
INVENTOR.
ROBERT S. DRUMMOND
BY
ATTORNEYS Feb. 12, 1946.   R. S. DRUMMOND   2,394,757
GEAR FINISHING MACHINE
Filed March 23, 1942   19 Sheets-Sheet 18

INVENTOR.
BY ROBERT S. DRUMMOND
ATTORNEYS

Feb. 12, 1946.　　　R. S. DRUMMOND　　　2,394,757
GEAR FINISHING MACHINE
Filed March 23, 1942　　19 Sheets-Sheet 19
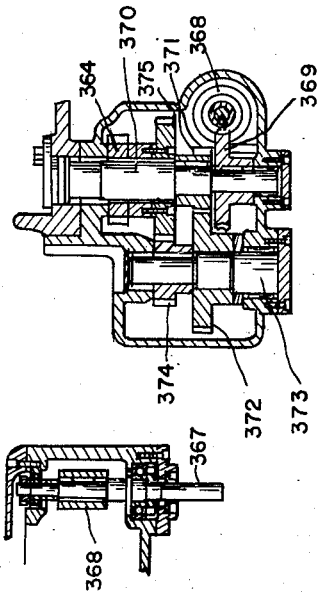
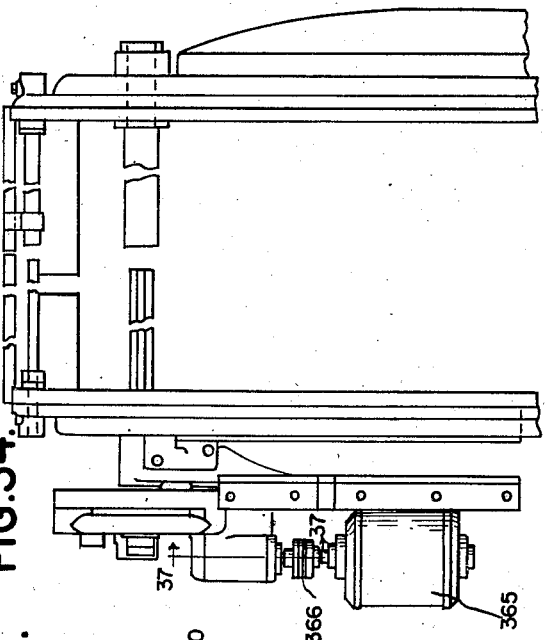
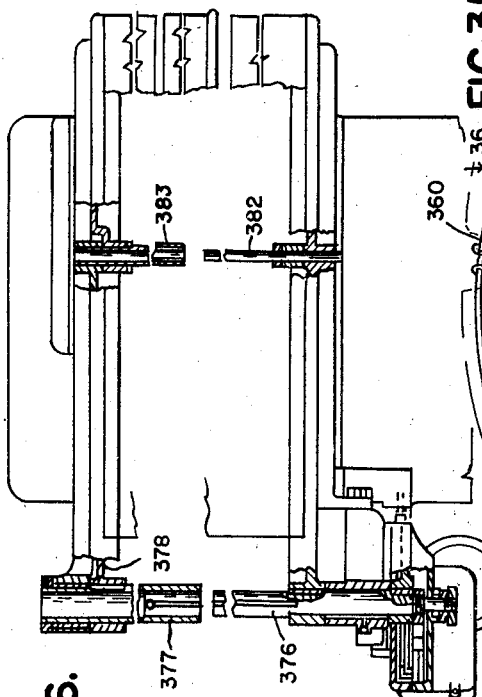
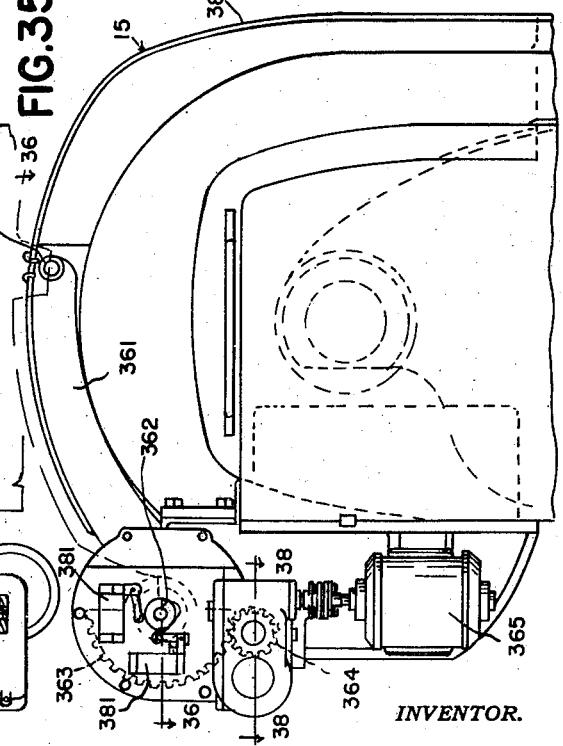
INVENTOR.
BY ROBERT S. DRUMMOND
ATTORNEYS Patented Feb. 12, 1946

2,394,757

UNITED STATES PATENT OFFICE 2,394,757

GEAR FINISHING MACHINE

Robert S. Drummond, Detroit, Mich., assignor to National Broach & Machine Company, a corporation of Michigan Application March 23, 1942, Serial No. 435,891

4 Claims. (Cl. 90—1.6)

The present invention relates to a gear finishing machine in which a work gear to be finished is mounted for meshed rotation with a gearlike cutter, with the axes of the gear and cutter crossed at an angle preferably between 3° and 30°; and in which relative translation is introduced between the gear and tool to distribute the finishing action of the tool longitudinally of the gear teeth, while at the same time the tool and gear are intermittently fed toward each other; and a relative rocking motion is or may be introduced between the gear and tool in timed relation to the said relative translation, in order to produce a longitudinally curved or crowned profile shape to the teeth of the gear.

It is an object of the present invention to provide a machine of the type described in which the work support is mounted for rocking movement, and such rocking movement is transmitted thereto by a connection between the work support and a tool slide or carriage.

It is a further object of the invention to provide a machine of the type described in which the work table is mounted for rocking movement on a base, in which aligned apertures are provided for the base and work support for the reception of a centering pin to prevent rocking movement of the work support where desired.

It is a further object of the invention to provide, in a machine of the type described, novel feeding means actuated upon relative reciprocation between the tool support and the work support.

It is a further object of the invention to provide a work support and tool support mounted for relative translation in combination with an adjustable sine bar mechanism associated with one of said supports, and connections between said sine bar mechanism and the other of said supports for rocking one of said supports in timed relation to relative translation between said supports.

It is a further object of the invention to provide a machine tool of the character described constructed and arranged to permit lowering into place of heavy work pieces without interference by parts of the machine.

It is another object of the invention to provide a machine of the type described having a hood or cover structure provided with power driven means for moving the hood to a position which permits loading and unloading of the work pieces into the machine.

Other objects of the invention will be apparent as the description proceeds and when taken in conjunction with the accompanying drawings, wherein:

Figure 4 is a top plan view of the machine;

Figure 5 is a front elevation of a subassembly, including the base and work table;

Figure 17:
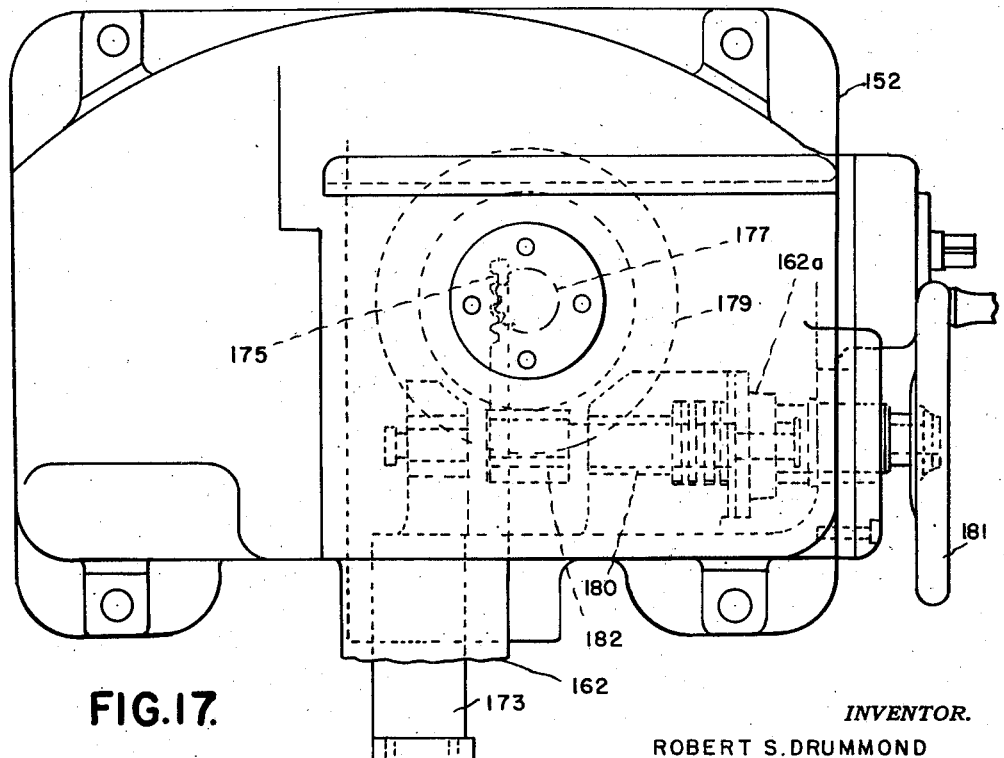
Figure 21:
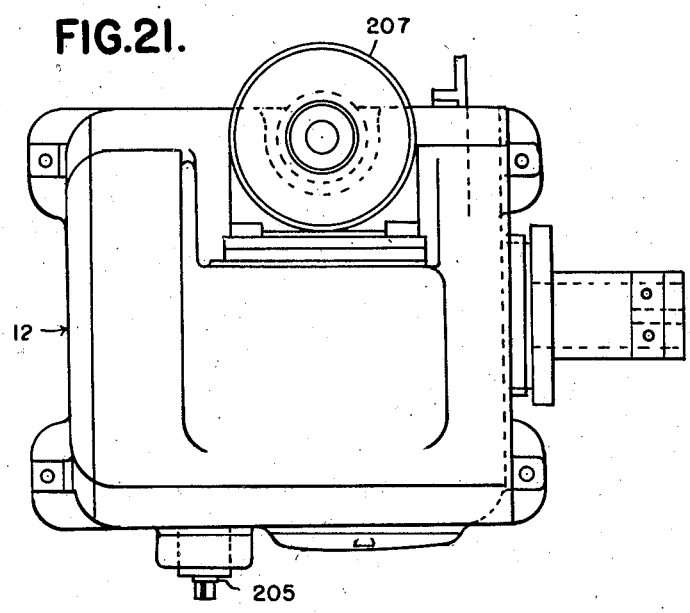
Figure 6A:
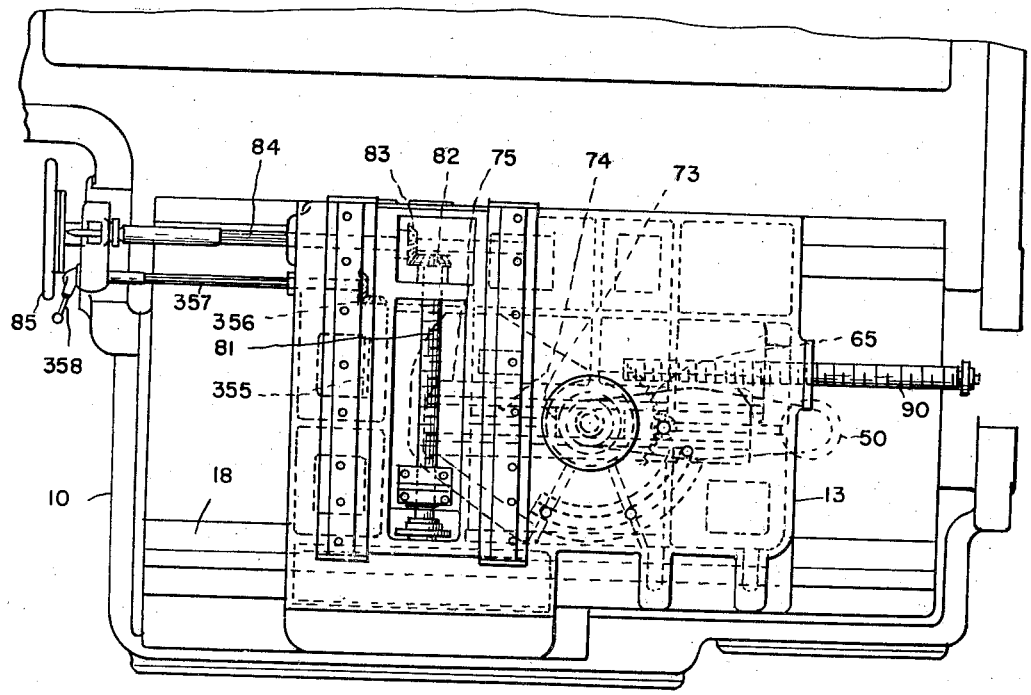
Figure 9:
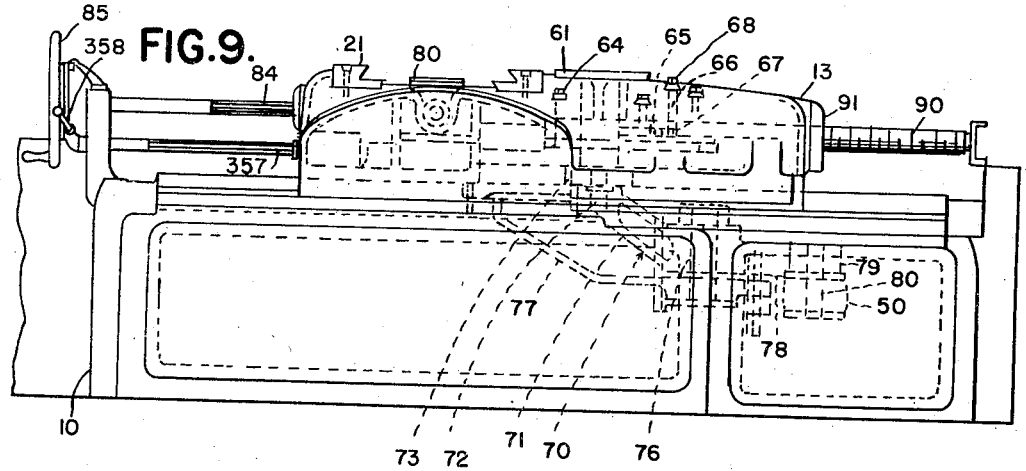
Figure 12A:
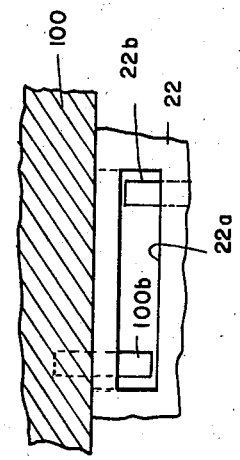
Figure 12:
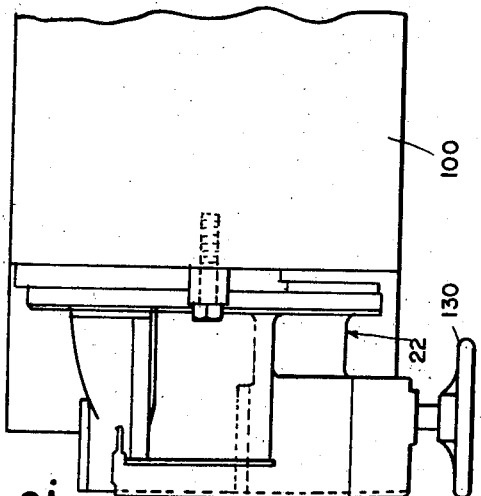
Figure 11:
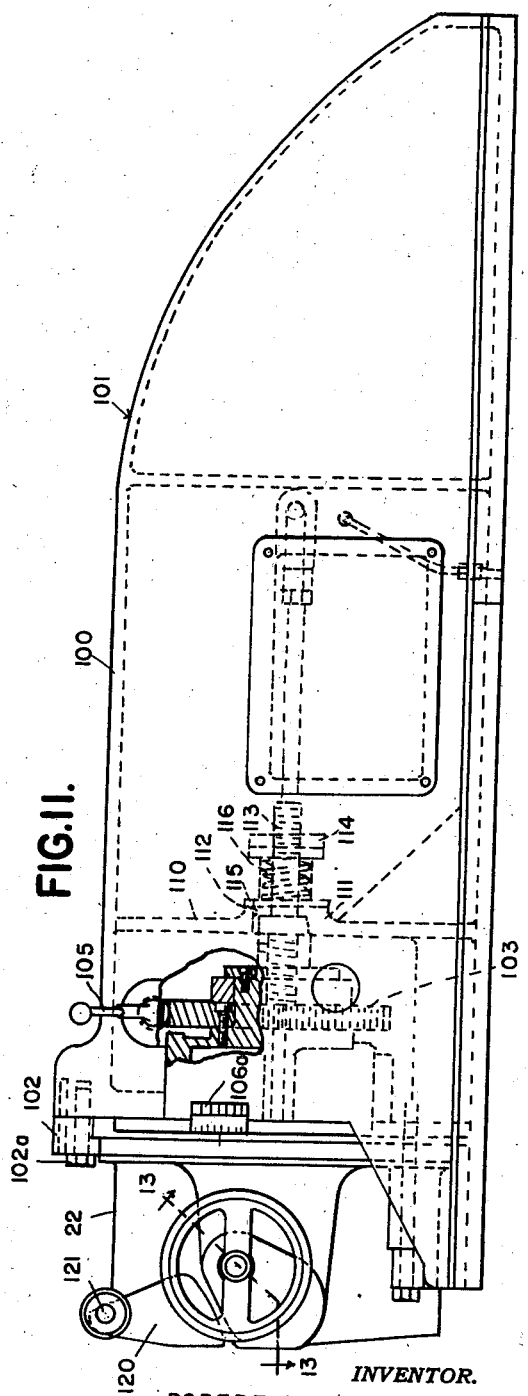
Figure 14:
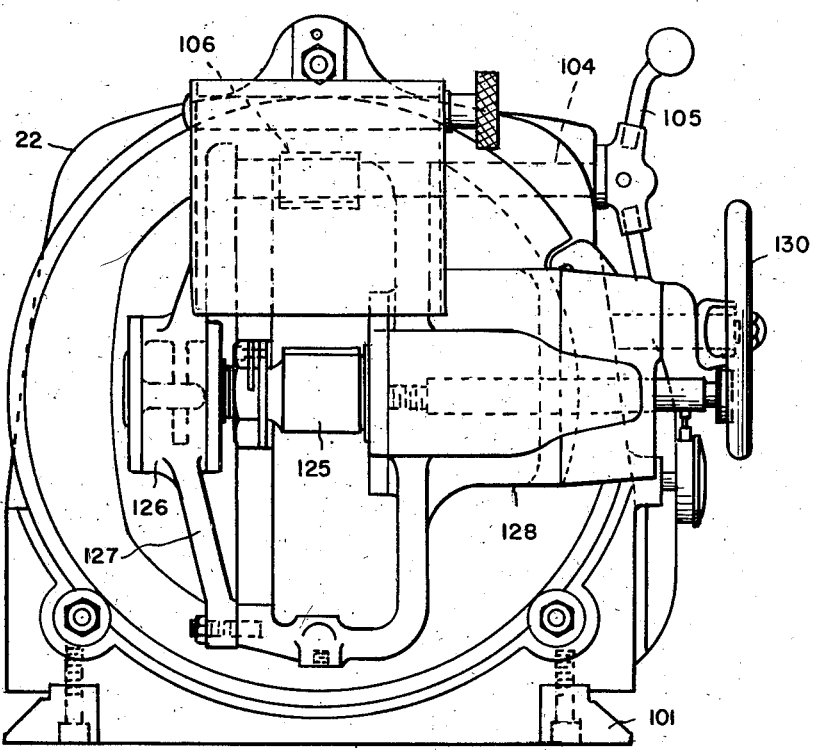
Figure 13:
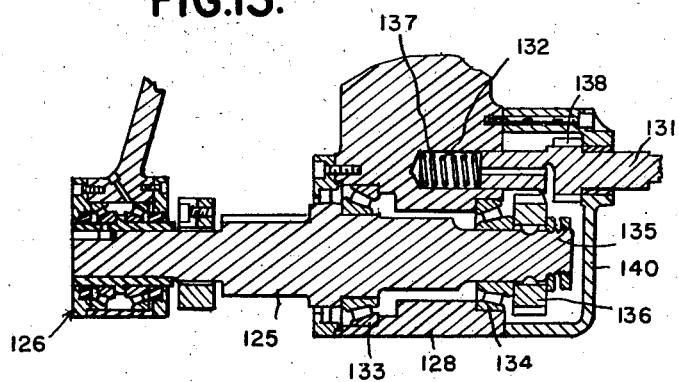
Figure 19:
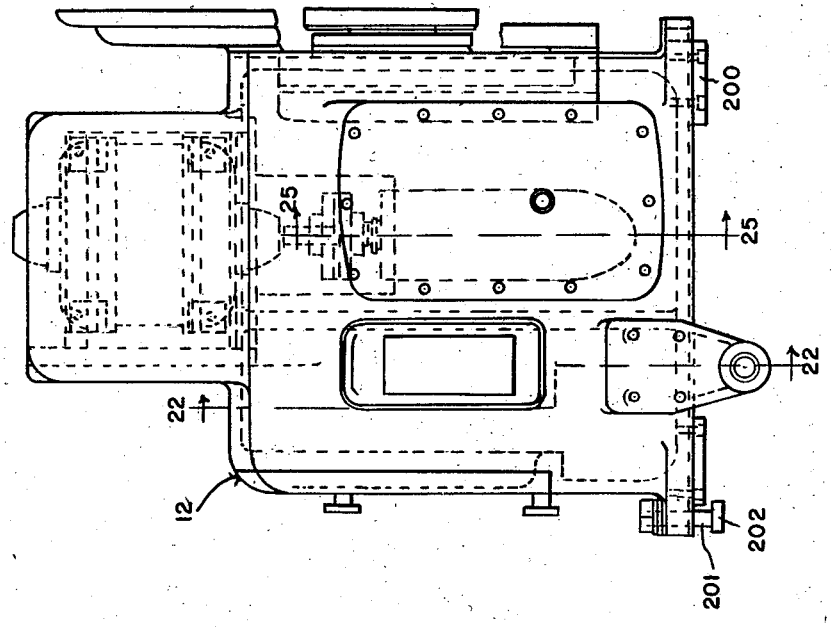
Figure 20:
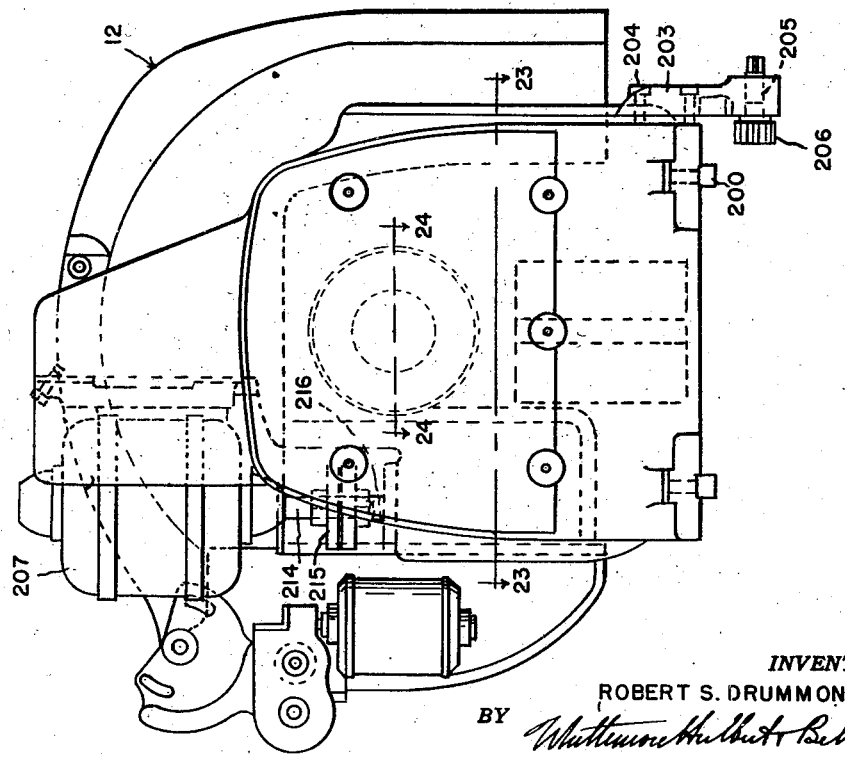
Figure 24:
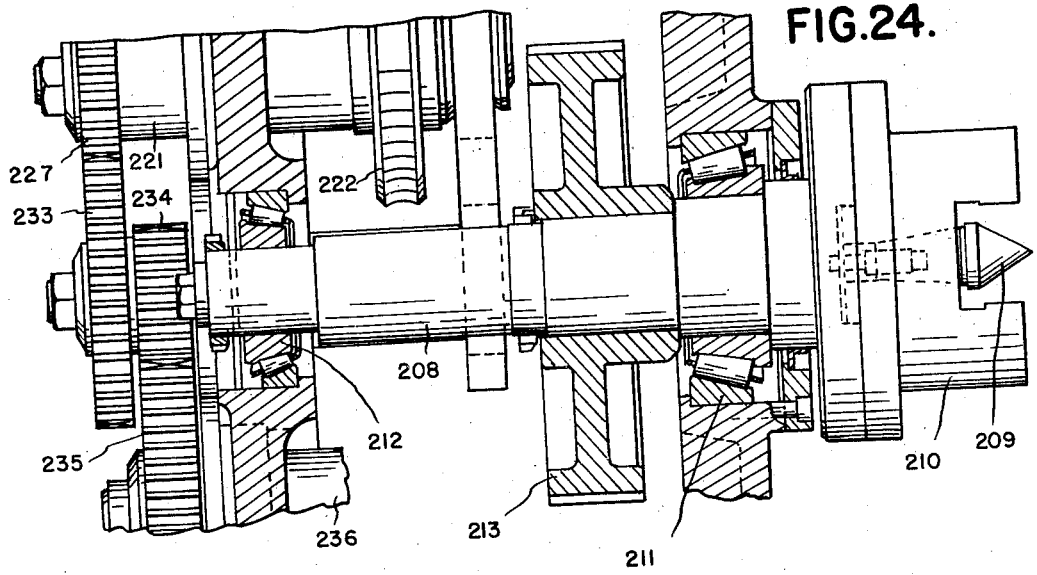
Figure 25:
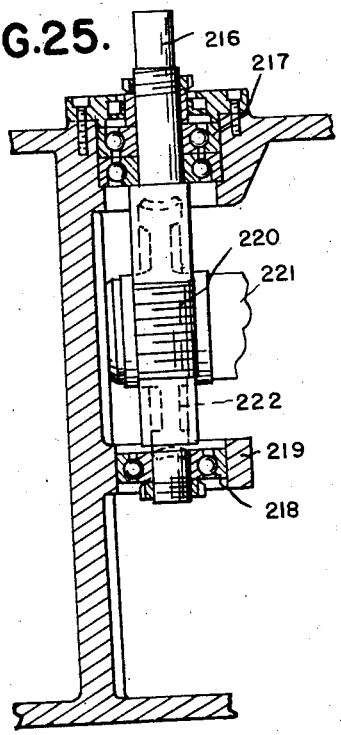
Figure 27:
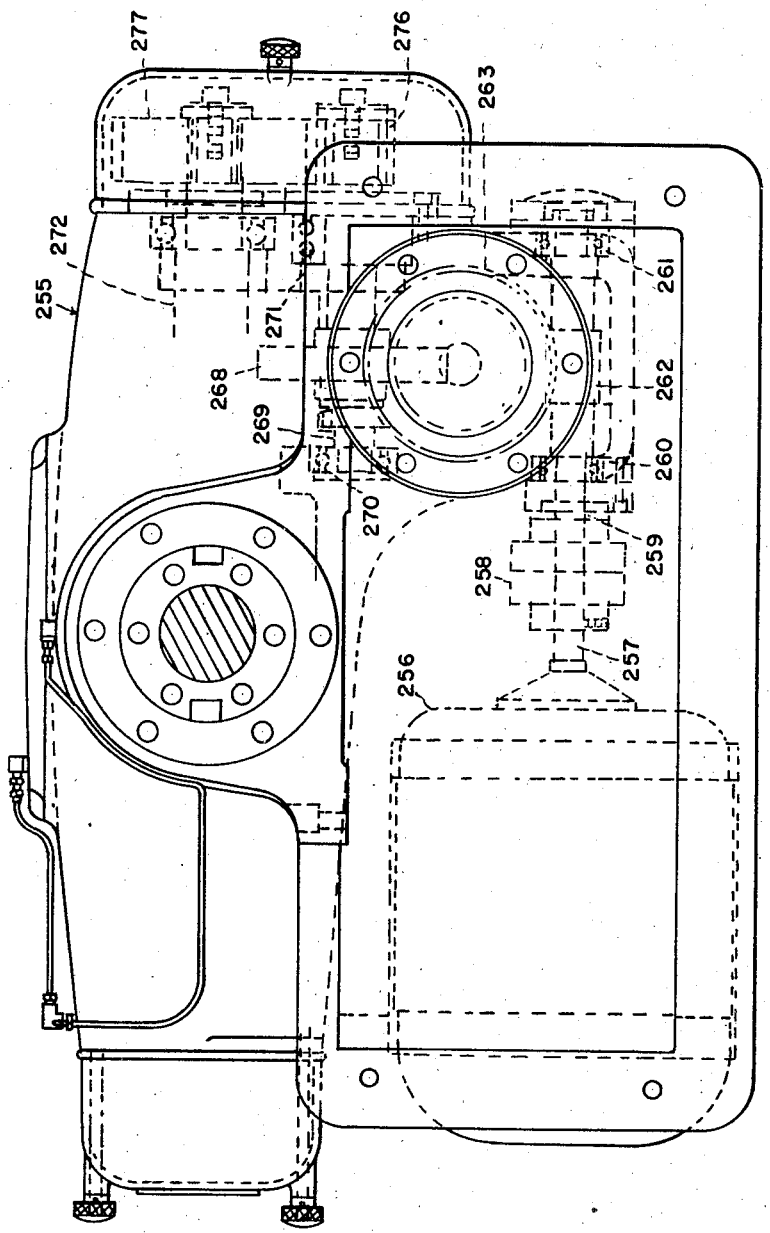
Figure 33:
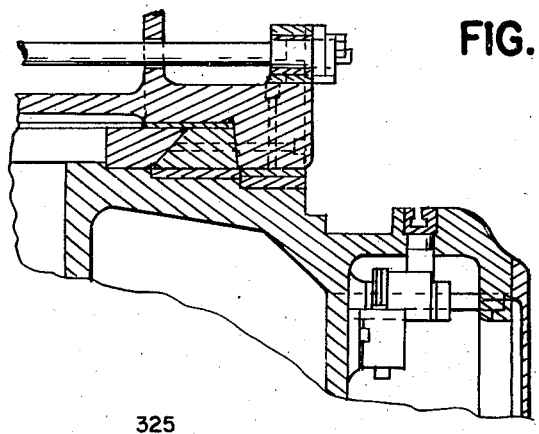
Figure 32:
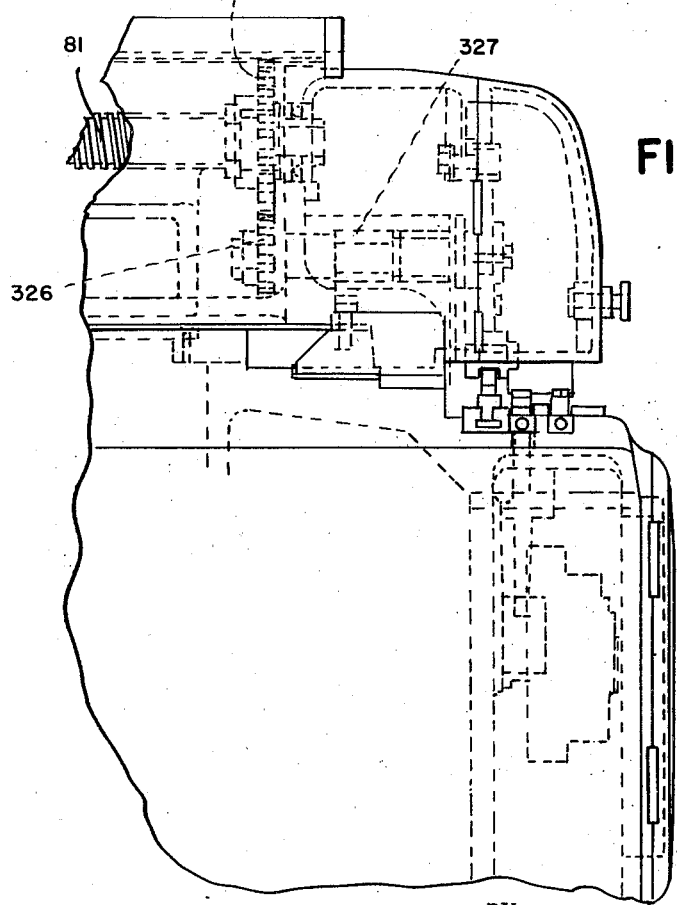

Figures 6 and 6a together comprise a top plan of the subassembly made up of the base, work table, and cutter carriage;

Figure 7 is a section on the line 7—7, Figure 6;

Figure 8 is a section on the line 8—8, Figure 6;

Figure 9 is a rear elevation of a subassembly comprising the base and work carriage;

Figure 10 is a side elevation of a subassembly comprising the base, work table, and cutter carriage, looking to the right of Figure 9;

Figure 11 is a side elevation of the tool slide;

Figure 12 is a top plan view of the tool slide;

Figure 12a is a diagrammatic sectional view illustrating measuring means for the head setting;

Figure 13 is a section on the line 13—13, Figure 11;

Figure 14 is a front elevation of the tool slide;

Figure 15 is a front elevation of the work tailstock;

Figure 16 is a side elevation of the work tailstock, looking to the left of Figure 15;

Figure 17 is a plan view of the work tailstock;

Figure 18 is a section on the line 18—18, Figure 15;

Figure 19 is a side elevation of the work headstock;

Figure 20 is a rear elevation of the work headstock, also showing the power actuated hood mechanism;

Figure 21 is a top plan view of the work headstock;

Figure 22 is a vertical section on the line 22—22, Figure 19;

Figure 23 is a horizontal section on the line 23—23, Figure 20;

Figure 24 is a horizontal section on the line 24—24, Figure 20;

Figure 25 is a fragmentary vertical section on the line 25—25, Figure 19;

Figure 26 is an enlarged rear elevation of the cross feed drive mechanism;

Figure 27 is a fragmentary section, looking toward the cross feed drive mechanism, as indicated by the arrows 27—27, Figure 26;

Figure 28 is a plan view of the cross feed drive mechanism;

Figure 29 is a rear view of the machine, with parts removed, showing part of the feed support control;

Figure 30 is a fragmentary plan view of the mechanism shown in Figure 29;

Figure 31 is an enlarged section on the line 31—31, Figure 30;

Figure 32 is a fragmentary end view of the machine, also showing the feed and control system shown in Figures 29 to 31;

Figure 33 is a fragmentary end elevation illustrating certain details of the feed and control system;

Figure 34 is a fragmentary front elevation illustrating the power actuated hood assembly;

Figure 35 is a side elevation of the hood assembly shown in Figure 34;

Figure 36 is a section on the line 36—36, Figure 35;

Figure 37 is a section on the line 37—37, Figure 34; and

Figure 38 is a section on the line 38—38, Figure 35.

For convenience, the description of this machine will be divided into separate headings but before proceeding to this detailed description, a general description of the assembly will be made.

Briefly described, the machine comprises a massive base casting on which a work table is mounted for rocking movement about a vertical axis. On the work table are provided a headstock and tailstock for positioning a gear therebetween, and the axis about which the work table rocks is located intermediate the headstock and tailstock, so that it may be located centrally with respect to the end surfaces of the gear. A tool carriage is mounted on the base for reciprocation in a direction parallel to the axis of the work gear. The tool carriage is provided with a sine bar device which, in turn, is connected to the work table so that when desired the work table can be rocked in timed relation to translation of the tool carriage. The sine bar assembly is adjustable and may be set at a zero angle, in which case the work table will not be rocked when the tool carriage is reciprocated. In order to insure rigidity and absolutely prevent rocking of the work table at this time, registering apertures in the work table and base are provided, through which locking pins may be dropped.

Mounted on the tool carriage is a tool slide terminating in an adjustable tool carrying head which is adjacent the work table. The tool carrying head may be adjusted about a horizontal axis, so that a gearlike tool carried thereby may be positioned at any desired crossed axes with respect to a gear mounted between the work headstock and tailstock. Feeding means are provided for feeding the tool slide toward the work support and this means is preferably mechanically actuated by reciprocation of the tool carriage, so that a small feeding movement takes place abruptly at the end of a translation of the reciprocation of the tool carriage.

In operation a gear to be machined is located with its axis horizontal and extending between the work headstock and work tailstock. The tool is located at the rear of the gear (with respect to the machine) with its axis extending in a vertical plane at an inclination to the horizontal. When it is desired to load or unload a gear, the tool slide is traversed rearwardly to provide ample clearance for loading and unloading of heavy work pieces by means of an overhead crane.

During the cutting operation coolant is preferably supplied to the cutting zone and, accordingly, it is desirable to provide a hood which will prevent splashing of coolant during the cutting operation. I have provided a special type of hood which has power means associated therewith for elevating the hood and folding the same toward the rear of the machine, so as to expose the work headstock and tailstock in order to permit loading and unloading of the work pieces therebetween.

General arrangement

Referring first to Figures 1 to 4, I have indicated the base of the machine at 10, the work tailstock at 11, the work headstock at 12, the tool carriage at 13, and the tool slide at 14. Intermediate the headstock and tailstock is provided the hood assembly 15.

The headstock 12 and the tailstock 11 are mounted on a work table 16 which, as shown in Figure 4, is mounted for oscillation about a vertical axis by means indicated generally at 17.

Figure 3:
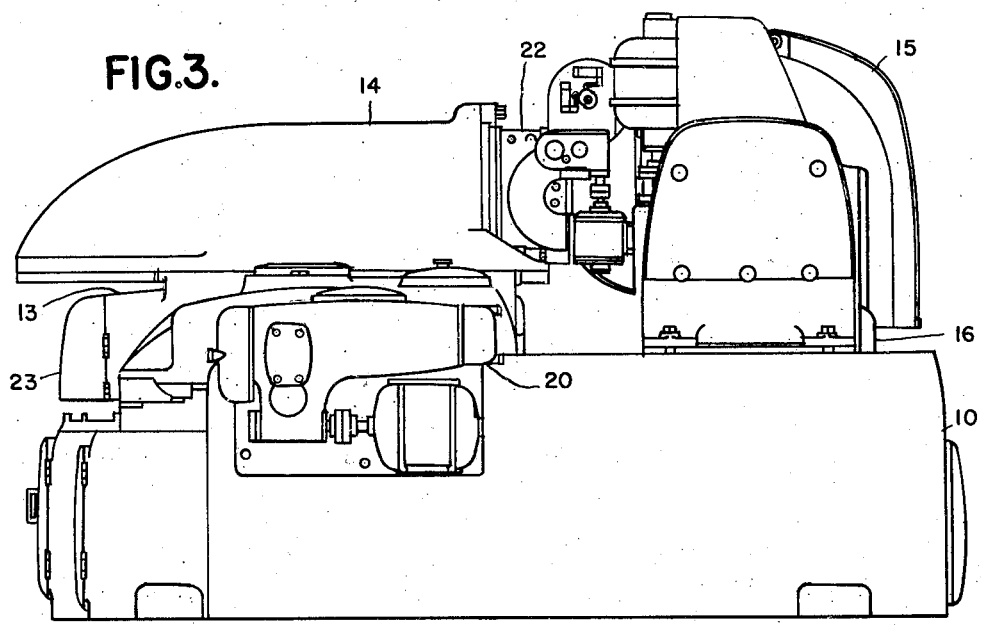
Figure 3 is a side elevation of the machine, looking to the right in Figure 1.

The tool carriage 13 is mounted for movement on the base, ways 18 being provided therefor. Reciprocation of the tool carriage 13 is accomplished by means of a feed screw 19, driven from a cross feed drive assembly indicated generally at 20. On the upper surface of the tool carriage 13, ways 21 are provided, which receive the tool slide 14 for feeding movement toward and away from the work table. As best seen in Figure 3, the tool slide 14 is provided with a head 22 at its front which is adjustable about a horizontal axis in order to position a tool carried thereby with its axis inclined to the horizontal. Means for feeding the tool slide 14 forwardly are provided in the tool carriage 13, a closure 23, as seen in Figure 3, being provided therefor.

As best seen in Figure 4, the work table 16 is provided at either end, with laterally projecting bosses 25 overlying similar bosses 26 formed on the base of the machine and when it is desired to position the work table 16 with its axis, as determined by the line of centers of the headstock and tailstock, parallel to the ways 18, pins 27 may be dropped into registering apertures formed in bosses 25 and 26.

Base—Table—Cross slide

For a description of the base, table, and cross slide and their assembly, reference is now made to Figures 5 to 14. Referring first to Figures 5 to 10, I have illustrated the subassembly of the base 10, the work table 16, and the tool carriage 13. As best seen in Figures 6 and 6a, the base 10 comprises a heavy casting to which the work table 16 is mounted for rocking movement about a vertical axis, as indicated at 17. In Figures 8, which is a vertical section through the axis of pivoting, the work table 16 is shown as having a central recess 30 in which is secured a swiveling member 31 having flange 32 bolted or otherwise secured to the underside of the work table 16, as indicated at 33. The base 10 is provided with a plurality of pads 35 on which are mounted hardened plates 36. Similar hardened plates 37 are provided on the underside of the work table 16 at corresponding positions, and between the plates 36 and 37 are ball bearings 38, retained in position by a retainer plate 40. This construction insures freedom of pivoting of the work table 16 on the base 10.

The base 10 is further provided with a central opening 40' in which is received a cup-shaped member 41 having flange 42 bolted or otherwise secured to a boss surrounding the opening 40', as indicated at 43. The interior of the cup-shaped member is adapted to receive the lower projecting portion of the swivel member 31, whereby the work table 16 is positively retained on the base 10 in accurately located position while at the same time swiveling movement about the axis of the swivel member 31 is permitted.

Hold-on clips 45 and 46 are secured to the base 10 overlying the work table 16, and bearings 47 are provided between the clips 45, 46 and the table 16.

As shown in Figure 7, the table 16 has formed therein opening 51 in the lower portion of which is secured a bearing 52 by means of bolts 53 or the like. The lever 50 is connected to the table 16 by means of a resetting pin 54, the upper portion of which is received within the bearing 52 and the lower portion of which is received within the bearing 56. At one end of the lever 50, a cover plate 57 is provided. The upper and lower portions of the pin 54 are slightly eccentric, and an adjustment is provided by rotating the resetting pin 54 slightly. The pin 54 at its upper end is provided with a radially extending flange which may be clamped in adjusted position by a clamping ring 54a. This adjustment provides for essential synchronizing of the table 16 with tool carriage 13 and is means for compensating for wear on the ways 18.

As best seen in Figure 5, the head 55 of the link 50 is secured adjacent one end of the table at a point far removed from the swivel connection 17 formed by the cup-shaped member 41 and the swivel member 31. Thus when movement is imparted to the link 50, the table 16 is rocked about the vertical axis 17.

Referring now to Figures 6a, 9 and 10, as well as Figure 4, the means for actuating the link 50 will now be described. Secured adjacent the underside of the tool carriage 13 is a sine bar assembly 60, which is journaled for adjustment about a vertical axis and has a supporting flange 61 extending above the tool carriage 13. The sine bar assembly includes an arcuate portion 62 (Figure 4) having an upwardly open T-slot 63 in which a plurality of clamping bolts 64 engage. The sine bar assembly also includes a segmental sectional gear portion 65, and carried by the tool carriage 13 is a vertical shaft 66 terminating at its lower end in a pinion 67 meshing with the gear 65. The upper end of the shaft is provided with a squared portion 68 adapted to be engaged by a suitable tool. When the clamping bolts 64 are released, the sine bar assembly may be adjusted about the vertical axis referred to by rotation of the shaft 66 through the meshing engagement of the pinion carried thereby and the gear 65. When the sine bar has been adjusted a desired amount, clamping bolts 64 may be tightened to firmly retain the sine bar in its position of adjustment.

Mounted in the base 10 of the machine is a bell crank 70 having an upwardly projecting arm 71 having a pin 72 which is received within a suitable opening in a block 73 slidable in a slot or groove 74 extending longitudinally of the sine bar proper 75, as best seen in Figure 6a. The bell crank 70, intermediate its ends, is mounted for oscillation about the vertical axis defined by a vertically extending pin 76 mounted in the base 10, a housing 77 for the bell crank 70 being provided. The other arm of the bell crank 70 is indicated at 78, and terminates in a head 79 carrying a pin 80 to which is connected the other end of the link 50.

It will thus be seen that when the sine bar assembly 65 is adjusted so that the ways defined by the groove or slot 74 extend at an angle to the ways 18 in which the tool carriage 13 traverses, an oscillating motion will be given to the bell crank 70 about its axis 76, in accordance with the reciprocation of the tool carriage 13. This oscillation of the bell crank 70 will be transmitted through the link 50 to the work table 16. The amplitude of the resulting rocking of the work table 16 about its vertical axis may be controlled by varying the angularity of adjustment of the sine bar assembly 73. At the same time, when the sine bar is adjusted so that slot 74 is parallel to the ways 18, the work table 16 may be positively retained in parallel relationship by means of the locator pins 27 previously referred to and well illustrated in Figure 5.

The ways 21 in which the tool slide is mounted are shown in Figure 9, and in this figure I have also shown a depending feed nut 80, which is normally secured to the underside of the tool slide 14. The feed nut 80 is provided with threads to engage corresponding threads on a feed screw 81, shown in Figure 6a. Means later to be described are provided for rotating the feed screw 81 automatically in accordance with the operation of the machine, but manual means for rotating this feed screw are also provided, and are seen in Figure 6a. Feed screw 81 is supported in suitable bearings, and at its inner end is provided with a bevel gear 82. The tool carriage 13 is provided with a similar bevel gear 83, supported thereon by suitable bearings and meshed with the bevel gear 82. Mounted on the base 10 of the machine is a spline shaft 84 having a spline connection with the bevel gear 83, so as to permit transverse reciprocation of the tool carriage 13 while maintaining the driving relation between the spline shaft 84 and the bevel gear 83.

Secured to the outer end of the spline shaft 84 is a hand wheel 85, by means of which the bevel gear 83 may be rotated in any position of transverse movement. Rotation of the hand wheel 85 and bevel gear 83 results in a corresponding rotation of the bevel gear 82 and the feed nut 80 and this, in turn, causes a forward and backward movement of the tool slide 14, to which the feed nut 80 is rigidly attached.

Means later to be described in detail are provided for effecting a slow reciprocation of the tool carriage 13 in the ways 18. This means includes a feed screw 90 which is associated with a feed nut 91 rigidly carried by the tool carriage 13. The tool slide 14 is shown in detail in Figures 11 and 12, and includes a main casting 100 having at its front portion an adjustable head 22. The tool slide 14 is provided with the feed nut 80 previously referred to, which is not shown in these figures, and is adjustable forwardly and backwardly in the ways 21 provided on the upper surface of the tool carriage 13. As best seen in Figure 14, removable gibs 101 are provided on the tool carriage 14 for association with the ways 21 just referred to.

The head 22 is adapted to be clamped in adjusted position on the main casting 100 by means of suitable clamping rings indicated at 102, retained in clamping position by bolts 102a.

Special means are provided for effecting accurate adjustment of the head 22 when the clamping rings 102 are released. The main casting 100 is hollow at its forward portion, and the head 22 has a rearwardly extending portion which extends into the casting 100 and terminates in a gear 103. Secured in the main casting 100, as best seen in Figure 14, is a shaft 104 having a double arm operating device 105, and provided adjacent its inner end with a worm 106. The worm 106 meshes with the gear or worm wheel 103, and accordingly, by rotation of the device 105 the head may be rotated about a horizontal axis.

Means for effecting very fine adjustments as to angularity of the head are provided. One of these comprises a dial indicator secured either to the head or to the casting 100, and on the other part is provided a post adapted to operate the operating arm of the indicator. This structure is not illustrated. Another rough indication of the angularity of the head is afforded by direct reading of a vernier scale, indicated generally at 106a in Figure 11.

Other means are provided, as best seen in Figure 12a. In this figure a portion of the casting 100 is illustrated as provided with a rigid post 100b. Adjacent the post 100b the head 22 is provided with an opening into which the post 100b extends. Communicating with this opening is a radially outwardly opening slot 22. A second post 22b is provided in the head in proximity to the post 100b. When the head has been adjusted to the desired angularity, an indicator reading over the pins or posts 22b and 100b may be taken by any suitable measuring instrument, access for this purpose being through the slot 22a. This reading may be recorded and the setting duplicated by effecting such adjustment as is necessary to reproduce the same reading on a second set up.

Main casting 100 is provided with an upwardly extending portion 110 having a boss 111 surrounding a central opening 112. Threaded to the rear end of the projecting portion of the head 22 is a friction device 113 which has a spring seat 114 threaded or otherwise secured thereto. The friction device 113 passes through the opening 112 and through a similar opening in a plate 115, which is seated on the boss 111. Intermediate the plate 115 and spring seat 114 is a compression spring 116. This spring exerts a force to the right on the seat 114 and thus urges the whole tool head assembly 22 to the right as seen in Figure 11. Thus when the clamping ring 102 is released the head 22 is frictionally retained against displacement, although such displacement may of course be effected by suitable operation of the adjusting worm 106 and associated worm wheel 103.

As best seen in Figure 11, a small protective hood 120 is provided, which may be swung upwardly about a pivot axis 121 to provide access for changing a tool carried by the head 22.

The tool head 22 comprises a tool spindle 125 journaled at one end in a bearing 126 carried by the spider 127, and journaled at its other end in a bearing housing 128. During operation the tool spindle 125 is freely rotatable, but it is desirable in some instances to be able to effect limited manual rotation of the tool spindle, as for example when meshing the tool with a large heavy gear. Means for effecting this adjustment are best seen in Figures 13 and 14, and comprise a hand wheel 130 secured to a shaft 131 which extends into an opening 132 in the bearing housing 128. The tool spindle 125 is mounted in bearings 133 and 134 and has a portion 135 extending therebeyond to which is keyed or otherwise secured a small gear 136. The shaft 131 to which the hand wheel 130 is secured is urged to the right, as seen in Figure 13, by compression spring 137 seated within the opening 132. Formed on the shaft 131 are pinion teeth 138 which, when the shaft 131 is in extreme right position as seen in Figure 13, will clear the teeth of the gear 136. Movement of the shaft 131 to the right under the influence of the spring 137 is prevented by engagement of the enlarged portion of the bearing pinion teeth 138 with a removable cover plate 140, as seen in Figure 13. Thus during normal operation of the machine the spindle 125 rotates freely in its bearings 133, 134 and similar bearings provided in the bearing 126. When it is desired to rotate the spindle 125 and a tool carried thereby so as to bring the teeth of the tool into meshing alignment with the teeth of a work gear, the hand wheel 130 is pressed inwardly, compressing spring 137 and meshing the pinion teeth 138 with the teeth of the gear 136. Rotation of the hand wheel will then impart a corresponding rotation to the spindle 125.

Work tailstock

The work tailstock indicated generally at 11 is mounted for adjustment in suitable ways 150 provided in the upper surface of the work table, the ways being shown at the left in Figure 6. Along one edge of the table, as seen in Figures 5 and 7, is provided a rack 151, by means of which both the headstock and tailstock are adjustable. Referring now to Figures 15 to 18, the work tailstock is shown in detail, and comprises a casting 152 provided at its under surface with seats for receiving keys 153 receivable in the keyways 150. The key-ways 150 are in the form of T-slots, and the tailstock 152 may be clamped in adjusted position by bolts 154 having heads 155 receivable in the key-slots, as is conventional.

In order to effect adjustment of the tailstock longitudinally of the ways 150, I provide a short shaft 156 provided at its inner end with a pinion 157 and having a squared end 158 for manipulation by a suitable wrench or tool. Pinion 157 meshes with the rack 151 previously referred to, and by this means the tailstock may be adjusted longitudinally of the work table.

The tailstock is provided with a live center 160 which is secured to a spindle 161, as best seen in Figure 18. The spindle 161 is journaled in an adjustable spindle housing 162, suitable bearings therefor being provided as indicated at 163, 164, 165, and 165a. The bearing 165a is seated against a tapered portion 165b of the spindle 161, the outer race of which butts up against a spacer 165c.

The center 160 has a tapered portion 166 received within a similarly tapered bore at one end of the spindle 161, and is clamped in place in this tapered recess by means of a shaft 167 having threaded end portion 168 received in a tapped seat at the inner end of the center 160. The shaft 167 is provided at its other end with a squared end portion 169 by means of which the center can be drawn down firmly into its tapered seat.

A guide assembly 170 is located beneath the center 160 and includes a plate 171 having an upwardly open V-shaped top surface which is adapted to receive and locate one end of a fixture supporting the gear to be finished. The plate 171 is mounted on a slidable support 172 which extends into the tailstock and is retained against rotation therein by reason of the flat surface 173 which cooperates with a similarly shaped surface in a plate 174 bolted to the tailstock casting 152. The guide assembly 170 may be adjusted in or out of the tailstock as desired.

This guide is an approximate locator adaptable to the work arbor and used as a rest when the work arbor is lowered into place. Advancing work center picks up arbor causing slight clearance when operating. The center is retractable for loading the work.

In order to retract the center 160 the housing 162 is provided at one side with a series of rack teeth 175. As best seen in Figure 15, a vertical shaft 176 is journaled in the headstock, and has formed thereon or secured thereto a pinion 177 which meshes with the rack teeth 175. The shaft 176 is provided with suitable bearings indicated at 178, and has a lower portion to which is secured a worm wheel 179. A second shaft 180 is journaled in the tailstock casting 152 and is provided with a handwheel 181 for rotating the same. The shaft 180 has secured thereon a worm 182 meshing with the worm wheel 179. Rotation of the handwheel 181 results in a corresponding rotation of the pinion 177 and, accordingly, serves to advance or retract the center housing 162. Tail center housing 162 is automatically locked by a "Swartz" jig lock 162a (Figure 17) that prevents rotation of the handwheel through axial force applied to the center 160.

Work headstock

Figure 1:
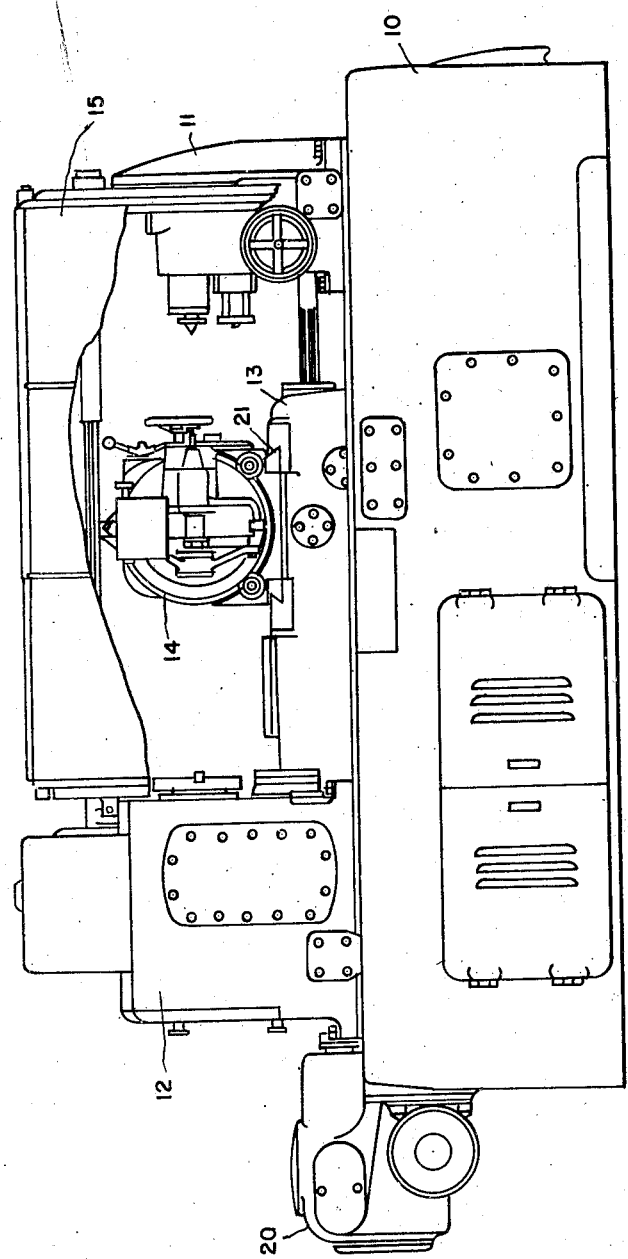
Figure 1 is a front elevation of the machine.
Figure 2:
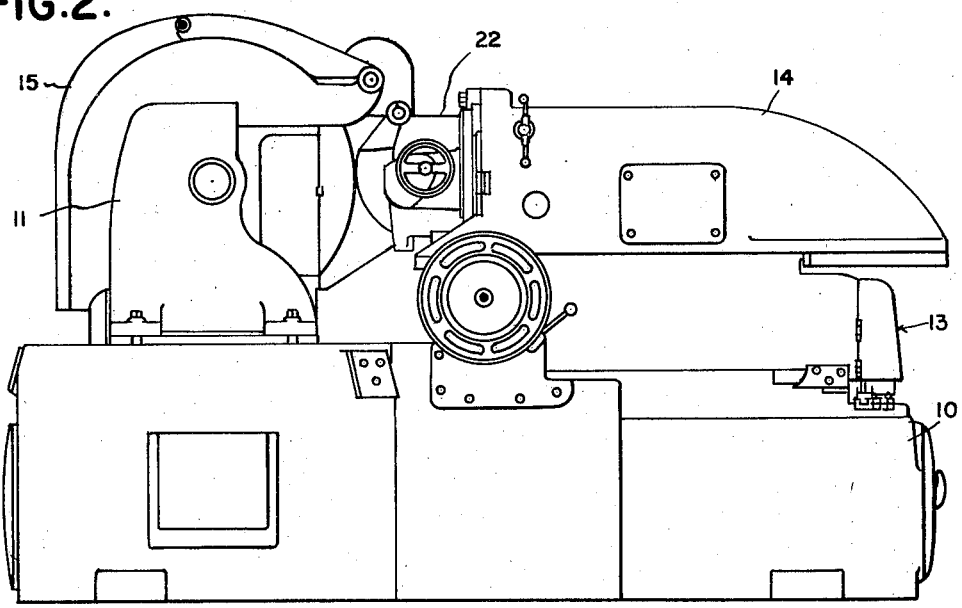
Figure 2 is a side elevation of the machine, looking to the left in Figure 1.

A power headstock for rotating the work piece is provided, which is shown in Figure 1 at 12 and is shown in detail in Figures 19 to 25. The work headstock is adjustable on the work table in the ways 150 previously referred to, and for this purpose the headstock is provided with keys 200 which are receivable in the ways 150, in combination with locking bolts 201 having heads 202 receivable in the T-slots forming part of the ways 150.

In order to adjust the headstock along the ways so as to accommodate different lengths of work pieces or work supporting fixtures, a bracket 203 is bolted or otherwise secured as indicated at 204 to one side of the work headstock 12, and has journaled therein a shaft 205 to which is secured or on which is formed a pinion 206 adapted to mesh with the rack 151, previously described and illustrated in Figure 5. The outwardly extending end of the shaft 205 is squared for cooperation with a tool for adjusting the headstock along the ways.

The work headstock includes a motor 207 for driving the work drive spindle 208 which, as shown in Figure 24, terminates in a center 209 and a drive plate 210. The spindle 208 is mounted in bearings 211 and 212 formed in the headstock and rotation is imparted thereto by a driving gear 213 keyed or otherwise secured to a mid portion of the spindle 208. The motor 207 is mounted with its axis vertical, and has a shaft 214 which connects through a flexible coupling 215 to a second shaft 216, all as seen in Figure 20.

The shaft 216, as best seen in Figure 25, is journaled in bearings 217 and 218, the latter being mounted in a boss 219 formed on a portion of the main casting of the headstock 12. The shaft 216, intermediate the bearings 217 and 218, is provided with teeth forming a worm 220. Mounted on a horizontal shaft 221 is a worm wheel 222 meshing with and driven by the worm 220.

Referring now to Figure 23, I have shown the shaft 216 and the shaft 221. The shaft 221 is journaled between bearings 223 and 224 mounted in webs 225 and 226 respectively, which are formed in the casting of the headstock 12. The shaft 221, adjacent one end thereof, has secured thereto a gear 227, which is secured on the end of the shaft 221 by a washer 228 and a nut 229. Mounted between the webs 225 and 226 is a second shaft 230, parallel to the shaft 221 and mounted in bearings 231 and 232. Adjacent one end of the shaft 230 is a gear 233 which meshes with the gear 227, and also carried adjacent the end of the shaft is a smaller gear 234 which meshes with a larger gear 235 carried by one end of the shaft 236. Gears 227, 233, 234 and 235 are change gears (spindle speed) and may be interchanged with other members of a set.

The shaft 236 is mounted in bearings 237 in the web 226, and the other end of the shaft 236 is provided with bearings 238 mounted in an apertured boss 239 formed in the main casting of the headstock 12. Intermediate the bearings 237 and 238 on the shaft 236 is provided a gear 250 which meshes with the gear 213 previously described. A closure plate 240 is provided which may be removed to give access to the bearings 238. The main casting of the headstock 12 is provided with a removable end closure 241 which gives access to the gears 227, 233, 234 and 235. Another removable closure 242 is provided for giving access to the interior of the main casting at the other side of the web 226, as best seen in Figure 23.

The gear 250 is adapted to mesh with the drive gear 213 which is keyed or otherwise secured to the drive spindle 208. The arrangement of the drive gears and their shafts is best seen in Figure 22. In this figure the web 226 has been broken through at 245 to show the worm 220 meshing with the worm wheel 222, and thus driving the shaft 221 to which the gear 227 is secured. The gear 227 is shown as meshing with the larger gear 233 carried by the shaft 230, and a portion of this gear is broken away to show the smaller gear 234 meshing with the gear 235. The web 226 has been broken away again at 246 to show the gear 250 meshing with the drive gear 213 which, as previously described, drives the spindle 208.

Cross feed drive

The mechanism for reciprocating the tool carriage 13 on the ways 18 includes a feed screw 90, as seen in Figures 6a and 9. The mechanism for imparting rotation to the feed screw 90 in a controlled manner is best seen in Figures 26 to 28. The cross feed drive housing generally indicated at 255 is bolted or otherwise rigidly secured to the base 10 by bolts or other suitable securing means. Carried by the housing 255 is a motor 256 having a shaft 257 which connects through a flexible coupling 258 to a second shaft 259 supported in suitable bearings indicated at 260 and 261. The shaft 259, intermediate the bearings 260 and 261, has formed thereon or secured thereto a short worm 262 meshing with a worm wheel 263 mounted on a shaft 264. The shaft 264 is provided, adjacent its ends, with bearings 265 and 266, and intermediate these bearings is a worm section 267 which, in turn, drives a worm wheel 268 mounted on a shaft 269. The shaft 269 is provided with bearings 270 and 271, and has a portion projecting beyond the bearings 271. A second shaft 272 is mounted in the cross feed drive housing in bearings 273 and 274. One end of the shaft 272 extends beyond the bearings 274 to a point adjacent the extending end of the shaft 269 previously referred to. A removable cover 275 is provided for these two projecting ends of the shafts 272 and 269 for giving access thereto, and the two shafts are interconnected by change gears 276 and 277.

The opposite end of the shaft 272, as best seen in Figure 28, projects beyond the bearing 273 into a space provided with a removable closure 278 and carries a gear 279 which is one of a second set of change gears. The other gear 280 of this set is mounted on a shaft 281, which is provided with bearings 282 and 283, and has one end projecting beyond the bearing 283 which carries a bevel gear 284. Bevel gear 284, in turn, meshes with a large driving bevel gear 285 secured to a shaft 286 which is mounted in the housing in bearings 287 and 288. The shaft 286 is connected to the feed screw 90 through a coupling 290.

By the above described arrangement, rotation of the motor 256 is transmitted through two worm and worm wheel connections and two sets of change gears to the feed screw 90. The feed screw 90 will accordingly be given a very slow rotation, which may be modified by providing different sets of change gears, as will be readily understood.

The cross feed driving housing is a very heavy casting so that the parts carried thereby are rigidly supported against vibration, and, accordingly, the tool carriage 13 is reciprocated thereby smoothly and without vibration on the ways provided on the base of the machine.

*Feed and control system*

The machine is fully automatic in operation and certain control instrumentalities, now to be described, are located, preferably at the rear of the machine. These control instrumentalities comprise mechanically operated feeding means for advancing the tool slide toward the work supports at predetermined intervals, preferably upon completion of a stroke of the reciprocation of the tool carriage. Other electrical control means are provided for reversing the direction of rotation of the cross feed drive motor 256 and of the work headstock drive motor 207.

These instrumentalities are shown in Figures 29 to 32. In Figure 30, which is a fragmentary plan view of a portion of the rear of the machine, I have shown a pair of transversely slidable control bars 300 and 301. Figure 31 is a section through the end of one of these bars, as for example 301, and illustrates the arrangement thereof. The base of the machine is provided with an upstanding abutment 302 having a recess 303 formed in its inner end in which is located a projecting end 304 of a pin 305, slidably mounted in the opening 303 and having a head 306 normally received in a corresponding seat provided in the outer surface of the abutment 302. Secured to the inner end of the pin 305 is a head 307, which is shown as threaded to the end of the pin 304. A spring 308 is located within the opening 303 and bears against the inner end of the head 307, urging the same to the left as seen in Figure 31. The head 307 is adapted to engage the bar 301. It will be understood that both the bars 300 and 301 have spring heads, identical with the head 307, at both ends thereof so that both the bars 300 and 301 are normally located between fixed abutments and spaced from both of their respective abutments.

The bars 300 and 301 are provided with T-slots 310 in which headed bolts 311 are provided. Bolts 311 may be adjusted along their T-slots to any desired position, in order to locate them in predetermined relationship, to actuating dogs carried by the tool carriage, one of said dogs being shown at 312. Means for actuating the electrical control elements are carried by the bars at their outer surfaces, one such means being indicated at 313 for swinging a control lever 314, which is shown as associated with the circuit controlling switches or relays 315 and 316. A similar circuit control element 318 is shown as provided with a depending roller 319 associated with a lever 320 which is arranged to actuate a safety switch or relay 321.

By the above described arrangement it is possible to provide switches in fixed positions on the base, actuators such as the levers 314 and 320 in fixed position on the base, and to have these devices operate by trip dogs such as 312 carried in fixed position on the tool carriage 13. It will be understood that the tool carriage may occupy widely different positions for finishing different gears, as for example when the gear to be finished is located adjacent one end of a shaft, and the tool carriage may be removed from its operating position which it would occupy if the gear were adapted to be supported upon a symmetrical fixture. The accommodation of the trip dog 312 to the switches ultimately actuated thereby is by adjustment of the headed bolts 311, which may be adjusted along T-slots 310 of the bars 301. This is an important feature of the machine and contributes to the wide range of work which may be operated on thereby.

The mechanism for intermittently feeding the tool slide 14 toward the work in the ways 21 provided on the top of the tool carriage 13 will now be described. Attention is directed particularly to Figures 29 and 32. In these figures I have indicated at 81 the feed screw for feeding the tool slide toward the work support. The tool slide is not shown in these figures but as previously described, it is mounted in the ways 21 and is provided with a depending feed nut 80 in which the feed screw 81 engages.

In order to impart intermittent rotation in a predetermined amount to the feed screw 81 so as to feed the tool slide toward the work support, and thus cause the finishing tool to be fed into the gear, the following mechanism is provided: The feed screw 81 is provided, adjacent its rearward end, with a gear 325. This gear, in turn, meshes with a gear 326 carried by a shaft 327 to which is secured a ratchet wheel 328, the ratchet wheel being shown in Figure 29. Mounted coaxially with the shaft 327, adjacent the ratchet wheel 328, is a lever 329. The lever structure 329 has a projecting arm 330 to which is pivoted a second lever 331. The lever 331 carries a pawl 332 adapted to engage the teeth of the ratchet wheel 328, and a spring 333 biases the lever 331 in a direction to cause the pawl 332 to engage the teeth of the ratchet wheel 328.

Pivoted to the tool carriage 13, as indicated at 335, is a trip lever 336 carrying a roller 337 adapted to be engaged by trip dogs 338 carried by the base of the machine. A link 340 interconnects the free end of the lever 336 and an arm 341 of the lever structure 329. A spring 342 biases the lever structure 329 in a clockwise direction.

Secured on the tool carriage 13 is an adjustable gauge 343 which, as shown, may be adjusted in 90° steps about its pivot axis 344. Four sides of the gauge 343 are located at predetermined distances from the pivot axis 344 and, accordingly, as will later appear, each 90° adjustment of the gauge 343 results in a predetermined controlled amount of feed upon each stroke of the tool carriage 13.

The free end of the arm 341 is provided with an adjustable abutment 345, which is adapted to engage whichever surface of the gauge 343 is uppermost.

Mounted on a boss 346 of the tool carriage 13 is an adjustable stop 347, which is adapted to engage the finger 348 formed on the pivoted lever 331.

From the foregoing described structure it will be apparent that when the tool carriage 13 is reciprocated so that the roller 337 rides up on one of the trip dogs 338, the lever 336 will be rocked in a counterclockwise direction, as seen in Figure 29, and will rock the lever structure 329 in a similar counterclockwise direction about the axis of the shaft 327. The initial rocking movement of the lever structure 329 begins from a point at which the adjustable abutment 345 rests upon one of the gauge surfaces of the gauge 343. At this time, due to the action of the spring 333, the pawl 332 will be in driving engagement with the teeth of the ratchet wheel 328, and, accordingly, as the lever structure 329 rotates in a counterclockwise direction, a similar rotation is imparted to the shaft 327 and, through the gears 326, 325, to the feed screw 81. When the lever structure 329 has rotated a certain amount in a counterclockwise direction, the finger 348 engages the adjustable stop 347, and further movement of the lever structure 329 in a counterclockwise direction results in the lever 331 being rocked about its pivoted connection to the lever structure 329, so as to withdraw pawl 332 from the teeth of the ratchet wheel, thus terminating the feeding stroke. Further movement of the lever structure 329 continues causing ratchet pawl to introduce clearance between itself and ratchet plate sufficient to permit the shield 328a covering a portion of the teeth and the teeth also to rotate to retract tool slide at end of cycle. Shield 328a can be set to determine number of feeding strokes, thereafter being interposed below pawl 332 to permit idle stroke. This shield can be set in connection with the timer to control the number of strokes on the tool carriage. The amount of feeding movement is accurately controlled by selection of the proper gauge surface of the gauge 343.

Means for manually advancing or retracting the tool slide on the tool carriage 13 was previously described, and it will be appreciated that for manual traverse of the tool slide in at least one direction, and preferably in both directions, the pawl 332 must be released from the ratchet wheel 328. This is accomplished by providing a peripherally notched disc 350 on the tool carriage 13 and an associated stop pin 351 for limiting rocking movement of the disc 350. Secured eccentrically to the disc 350 I provide a link 352, the free end of which is slidable in a horizontal guideway provided therefor. The free end of the link 352 is provided with a pin 353. The pin 353 projects into the plane of oscillation of the lever 331, and when the plate 350 is rotated sufficiently, the pin 353 will engage the downwardly projecting portion of the lever 331 and rock the same to a position in which the pawl 332 is disengaged from the ratchet wheel 328. At this time the feed screw 81 is manually controlled as previously described.

The disc 350 is connected to a shaft 355 (seen in Figure 6a) which is connected through bevel gears 356 to a spline shaft 357. The shaft 357 is provided with a hand actuator 358 located adjacent the front of the machine and also adjacent the hand wheel 85, by means of which the tool slide 14 is manually moved.

*Hood assembly*

In order to prevent splashing of coolant during the cutting operation, I provide a hood which is adapted to substantially completely enclose the cutting zone during the operation. Since this machine is very heavy and of large capacity, the hood for enclosing the cutting zone is necessarily heavy, and, accordingly, I have provided novel mechanism for elevating the hood in a manner to completely expose the work piece for loading and removal. This structure is best seen in Figures 34 to 38, although some of the structure is well illustrated in Figure 20.

The hood 15 is preferably made of sheet metal provided with a suitable stiffening frame, and is further preferably made, in two pieces, pivoted together at 360. The inner frame of the hood 361 is pivoted as indicated at 362, these pivot points being provided in the headstock and tailstock 12 and 11 respectively. The inner frame portion 361 of the hood has secured thereto in driving relation a gear segment 363 which is meshed with a drive pinion 364. A hood elevating motor 365 is provided which drives, through a flexible coupling 366, a shaft 367, best seen in Figure 37. The shaft 367 is provided with a worm 368 which meshes with a worm wheel 369 carried by a shaft 370. The worm 369 is keyed or otherwise secured to the shaft 370 in driving relation thereto. Also keyed to the shaft in driving relation thereto is a pinion 371 which meshes with a gear 372, keyed or otherwise secured to a countershaft 373. The countershaft 373 is, in turn, provided with a pinion 374 which meshes with a gear 375. The gear 375 is loosely mounted on the shaft 370 and is bolted to the gear 364 previously described. The gear 364, meshing with the gear segment 363, is adapted to rotate a shaft 376, which has a telescoping, driving relation with a sleeve 377 to which is rigidly secured a frame portion 378 of the hood, which is similar to the portion 361 previously described. Thus when rotation is imparted to the gear segment 363, the frame portions 361 and 378 of the hood 15 are swung upwardly about the axis 362. The forward portion 380 of the hood is thus raised upwardly and at the same time carried rearwardly. The arrangement of the parts and their dimensions are such that the forward portion 380 of the hood is moved substantially to the rear of the line of centers of the headstock and tailstock so that these centers are fully exposed from an upward direction. Accordingly, heavy work gears may be loaded and unloaded by means of an overhead crane.

The motor 365 is provided with a suitable limit switch indicated generally at 381 in conjunction with actuators movable with the frame part 361 so that when the motor 365 is started in either direction to raise or lower the hood, the operation is completed and the motor 365 is automatically shut off.

The pivot connection between the forward portion and the rear portion of the hood is provided by a rod 382 which is telescoped within a tubular member 383. It will be recalled that the driving connection to the inner portion of the hood was also accomplished through telescoping members. This arrangement is provided so that the headstock and tailstock may be adjusted toward or away from each other without disturbing the operation of the hood. The cover for the hood will of course be collapsible in like manner.

While I have illustrated and described in some detail a preferred embodiment of my improved gear finishing machine, it is to be understood that this has been done solely to enable those skilled in the art to practice the invention, the scope of which is indicated by the appended claims.

What I claim as my invention is:

1. A gear finishing machine comprising a base, a work supporting table on said base having a work spindle, said table being mounted on said base for swivel movement about an axis perpendicular to the axis of said spindle, a tool carriage on said base reciprocable in a path parallel to said spindle, a tool head on said carriage mounted for adjustment about an axis perpendicular to the axis of said work spindle, a sine bar in said carriage adjustable to vary the inclination thereof to the path of travel of said carriage, a follower for said sine bar, linkage connected to said work table at a point spaced from the swivel connection thereof and connected at its opposite end to said follower, whereby upon reciprocation of said carriage, said table is swiveled in accordance with the inclination of said sine bar.

2. A gear finishing machine comprising a base, a work table on said base, means on said table for supporting a work piece for rotation, motor means on said table for rotating said piece, a tool carriage mounted on said base for reciprocation in a plane parallel to the axis of said piece, a tool slide on said carriage movable toward and away from said work table, an adjustable swivel head on said slide, tool supporting means on said slide, said last means comprising a tool spindle, a gear on said tool spindle, a manually rotatable gear on said head, said last gear being movable between a drive position in which it meshes with said first gear and a clearance position in which it clears said first gear, and resilient means for biasing said second gear toward clearance position.

3. A gear finishing machine comprising a base, a work supporting table having a spindle and mounted on said base for swivel movement about an axis transverse to the axis of said spindle, a tool carriage reciprocable in a path parallel to said spindle, a tool head on said carriage mounted for adjustment about an axis transverse to the axis of said spindle, a sine bar on said carriage adjustable to vary the inclination thereof to the path of travel of said carriage, a follower for said sine bar, and linkage connected to said work supporting table at a point spaced from the swivel connection thereof and also connected to said follower to swivel said table in accordance with the inclination of said sine bar upon reciprocation of said carriage.

4. A gear finishing machine comprising a base, a work supporting table on said base, means on said table for supporting a work piece for rotation, motor means for rotating said work piece, a tool carriage mounted on said base for reciprocation in a plane parallel to the axis of said work piece, a tool slide on said carriage movable toward and away from said work supporting table, an adjustable swivel head on said slide, tool supporting means on said slide comprising a tool spindle, a gear on said tool spindle, a second gear on said head movable between a drive position in which said second gear meshes with said first mentioned gear and a clearance position in which said second gear clears said first mentioned gear, and means for urging said second gear toward clearance position.

ROBERT S. DRUMMOND.